United States Patent
Matsumoto et al.

(10) Patent No.: US 8,103,482 B2
(45) Date of Patent: Jan. 24, 2012

(54) SENSOR EVALUATION SYSTEM, SENSOR EVALUATION METHOD, AND STORAGE MEDIUM RECORDING SENSOR EVALUATION PROGRAM

(75) Inventors: Yasuhide Matsumoto, Kawasaki (JP); Masatomo Yasaki, Kawasaki (JP); Youji Kohda, Kawasaki (JP); Satoru Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 590 days.

(21) Appl. No.: 12/187,785

(22) Filed: Aug. 7, 2008

(65) Prior Publication Data

US 2009/0048809 A1    Feb. 19, 2009

(30) Foreign Application Priority Data

Aug. 13, 2007    (JP) .................................. 2007-210928

(51) Int. Cl.
G06F 17/40    (2006.01)
G06Q 10/00    (2006.01)

(52) U.S. Cl. ...................................... 702/187; 705/7.11
(58) Field of Classification Search .................. 702/187, 702/79, 81, 84, 176–179, 182–183, 188; 705/1.1, 7–11, 15–17, 21–23, 28, 348; 707/736, 707/748–751, 758; 709/223–224, 226; 235/375–377, 385

See application file for complete search history.

(56) References Cited

U.S. PATENT DOCUMENTS

| | | | |
|---|---|---|---|
| 6,324,290 B1 | 11/2001 | Murakami | 381/92 |
| 6,842,719 B1 * | 1/2005 | Fitzpatrick et al. | 702/182 |
| 7,852,761 B2 * | 12/2010 | Neugebauer | 370/230.1 |
| 2008/0077510 A1 * | 3/2008 | Dielemans | 705/28 |

FOREIGN PATENT DOCUMENTS

| | | |
|---|---|---|
| EP | 0 671 610 A2 | 9/1995 |
| EP | 0 671 610 A3 | 1/1996 |
| EP | 0 671 610 B1 | 5/2000 |
| JP | 07-243906 | 9/1995 |
| JP | 2002-157233 | 5/2002 |
| JP | 2003-123177 | 4/2003 |

\* cited by examiner

Primary Examiner — Michael Nghiem
Assistant Examiner — Toan Le
(74) Attorney, Agent, or Firm — Staas & Halsey LLP

(57) ABSTRACT

A sensor evaluation system communicating to a plurality of sensors and an analysis system providing analysis service using time series sensor data obtained from at least one of the plurality of sensors includes a time series data recorder recording a time series data showing changes with time of events having predetermined relations with the analysis service associating with the analysis system, a sensor relevance ratio calculator calculating sensor relevance ratios indicating relevance ratios of sensor data to the time series data by comparing changes with time of events indicated by the time series data and time series records of the sensor data used by the service execution part to provide analysis service in the same period, and a sensor importance calculator calculating sensor importance using the sensor relevance ratio calculated by the sensor relevance ratio calculator as a guide before recording the calculated sensor importance in a sensor importance recorder.

13 Claims, 17 Drawing Sheets

FIG. 3

ANALYSIS SYSTEM 4a (TIME SERIES DATA $Y_1$)

| SENSOR | SENSOR RELEVANCE RATIO |
|---|---|
| SENSOR 3a (SENSOR DATA $X_1$) | 0.6 |
| SENSOR 3b (SENSOR DATA $X_2$) | 0.7 |
| SENSOR 3c (SENSOR DATA $X_3$) | 0.9 |
| ... | ... |

ANALYSIS SYSTEM 4b (TIME SERIES DATA $Y_2$)

| SENSOR | SENSOR RELEVANCE RATIO |
|---|---|
| SENSOR 3a (SENSOR DATA $X_1$) | 0.1 |
| SENSOR 3b (SENSOR DATA $X_2$) | 0.7 |
| ... | ... |

FIG. 4

| IDENTIFICATION DATA | ANALYSIS SYSTEM IMPORTANCE |
|---|---|
| 001 (ANALYSIS SYSTEM 4a) | 3 |
| 002 (ANALYSIS SYSTEM 4b) | 1 |
| ... | ... |

FIG. 5

| SENSOR | SENSOR IMPORTANCE |
|---|---|
| SENSOR 3a | 1.9 |
| SENSOR 3b | 2.8 |
| SENSOR 3c | 2.7 |
| ... | ... |

FIG. 10

3a
SENSOR
IMPORTANCE: 1.9

NUMBER OF ITEMS IN STOCK: 5

3b
SENSOR
IMPORTANCE: 2.8

NUMBER OF ITEMS IN STOCK: 20

3c
SENSOR
IMPORTANCE: 2.7

NUMBER OF ITEMS IN STOCK: 10

FIG. 15

ANALYSIS SYSTEM 4a

| SENSOR | SENSOR REFERENCE DEGREE |
|---|---|
| SENSOR 3a (SENSOR DATA $X_1$) | 1 |
| SENSOR 3b (SENSOR DATA $X_2$) | 2 |
| SENSOR 3c (SENSOR DATA $X_3$) | 4 |
| ... | ... |

ANALYSIS SYSTEM 4b

| SENSOR | SENSOR REFERENCE DEGREE |
|---|---|
| SENSOR 3a (SENSOR DATA $X_1$) | 1 |
| SENSOR 3b (SENSOR DATA $X_2$) | 2 |
| ... | ... |

SENSOR EVALUATION SYSTEM, SENSOR EVALUATION METHOD, AND STORAGE MEDIUM RECORDING SENSOR EVALUATION PROGRAM

CROSS-REFERENCE TO RELATED APPLICATIONS

This application is related to and claims priority to Japanese Patent Application No. 2007-210928, filed on Aug. 13, 2007, the disclosure of which is incorporated herein by reference.

BACKGROUND

1. Field

The embodiments discussed herein are directed to a sensor evaluation system connected to a network including a plurality of sensors and a plurality of analysis systems having a service execution part providing analysis service using sensor data obtained from at least one of the plurality of sensors, a sensor evaluation method, and a storage medium recording a sensor evaluation program.

2. Description of the Related Art

In recent years, analysis service by an analysis system using sensor data obtained from sensors connected to a network has been offered. For example, an analysis system that uses image data (sensor data) obtained from cameras installed in a plurality of stores to provide service to analyze trends of customers' traffic lines in these stores is known. If such an analysis system is constructed, operation costs are needed due to installation of sensors, settings of the analysis system, sensor maintenance and the like. Particularly when a large number of sensors are installed and sensors are randomly inspected from among the large number of installed sensors, maintenance will be inefficient and more maintenance costs will be needed.

A system in which sensor importance is preset to each of a large number of sensors and the number of processors to be assigned to each sensor is determined according to the preset sensor importance has been known. The processor is a processing device for controlling sensor operation. Here, for example, if the sensor importance is high, the number of processors assigned to the sensor is increased, and if the sensor importance is low, the number of processors assigned to the sensor is decreased. Using such a system, for example, it becomes possible to inspect sensors in descending order of sensor importance. Accordingly, sensors can be inspected efficiently.

The use of the next-generation information communication network NGN (Next Generation Network) equipped with flexibility and economic efficiency of an IP network is becoming widespread in recent years while maintaining reliability and stability of a telephone network. That is, the NGN is a network integrating an IP network for Internet service and a telephone network for telephone service. In the NGN described above, the above sensor or analysis system can dynamically be added to/deleted from the network. Moreover, sensor data obtained from one sensor may be used not only by one analysis sensor, but also by a plurality of analysis systems. That is, sensor importance changes each time a sensor or an analysis system is dynamically added to/deleted from the network.

However, according to the above conventional method, sensor importance is preset to each of a large number of sensors and therefore, the sensor importance must be reset each time a sensor or an analysis system is dynamically added to/deleted from a network. Moreover, with increasing numbers of sensors and analysis systems connected to the network, it takes more and more time to predetermine which sensors among a large number of sensors are important.

SUMMARY

It is an aspect of the embodiments discussed herein to provide a sensor evaluation system, a sensor evaluation method, and a sensor evaluation program capable of calculating sensor importance without requiring much time even if a sensor or an analysis system is dynamically added to/deleted from a network.

According to an aspect of the invention, a sensor evaluation system connected to a network including a plurality of sensors and an analysis system having a service execution part providing analysis service using time series sensor data obtained from at least one of the plurality of sensors includes a time series data recorder recording a time series data showing changes with time of events having predetermined relations with the analysis service associating with the analysis system, a sensor relevance ratio calculator calculating sensor relevance ratios indicating relevance ratios of sensor data to the time series data by comparing changes with time of events indicated by the time series data and time series records of the sensor data used by the service execution part to provide analysis service in the same period, and a sensor importance calculator calculating sensor importance using the sensor relevance ratio calculated by the sensor relevance ratio calculator as a guide before recording the calculated sensor importance in a sensor importance recorder.

According to another aspect of the invention, a sensor evaluation system connected to a network including a plurality of sensors, an analysis system having a service execution part for providing analysis service using sensor data obtained from at least one of the plurality of sensors, and a plurality of business systems for executing predetermined functions includes a sensor reference degree calculator calculating sensor reference degrees indicating the degrees of sensor data used by the service execution part to provide analysis service being referenced based on at least one of the number of business systems that referenced sensor data obtained from the sensors, an access state of business systems that referenced sensor data obtained from the sensors, and a performance state of business systems that referenced sensor data obtained from the sensors and a sensor importance calculator calculating sensor importance using the sensor reference degrees calculated by the sensor reference degree calculator as a guide before recording the calculated sensor importance in a sensor importance recorder.

According to another aspect of the invention, a sensor evaluation method performed by a computer connected to a network including a plurality of sensors and an analysis system having a service execution part for providing analysis service using time series sensor data obtained from at least one of the plurality of sensors and provided with a time series data recorder in which time series data showing changes with time of events having predetermined relations with the analysis service is recorded by associating with the analysis system comprises a sensor relevance ratio calculation at which a sensor relevance ratio calculator provided with the computer calculates sensor relevance ratios indicating relevance ratios of sensor data to the time series data by comparing changes with time of events indicated by the time series data and time series records of the sensor data used by the service execution part to provide analysis service in an identical period, and a sensor importance calculation at which a sensor importance calculator provided with the computer calculates sensor importance using the sensor relevance ratios calculated at the sensor relevance ratio calculation as a guide before recording the calculated sensor importance in a sensor importance recorder.

According to another aspect of the invention, a sensor evaluation method performed by a computer connected to a network including a plurality of sensors, an analysis system having a service execution part for providing analysis service using sensor data obtained from at least one of the plurality of sensors, and a plurality of business systems for executing predetermined functions and comprises a sensor reference degree calculation at which a sensor reference degree calculator provided with the computer calculates sensor reference degrees indicating the degrees of sensor data used by the service execution part to provide analysis service being referenced based on at least one of a number of business systems that referenced sensor data obtained from the sensors, an access state of business systems that referenced sensor data obtained from the sensors, and a performance state of business systems that referenced sensor data obtained from the sensors, and a sensor importance calculation at which a sensor importance calculator provided with the computer calculates sensor importance using the sensor reference degrees calculated at the sensor reference degree calculation as a guide before recording the calculated sensor importance in a sensor importance recorder.

According to another aspect of the invention, a sensor evaluation program for causing a computer connected to a network including a plurality of sensors and an analysis system having a service execution part for providing analysis service using time series sensor data obtained from at least one of the plurality of sensors and provided with a time series data recorder in which time series data showing changes with time of events having predetermined relations with the analysis service is recorded by associating with the analysis system to perform processing and includes sensor relevance ratio calculation processing for calculating sensor relevance ratios indicating relevance ratios of sensor data to the time series data by comparing changes with time of events indicated by the time series data and time series records of the sensor data used by the service execution part to provide analysis service in an identical period, and sensor importance calculation processing for calculating sensor importance using the sensor relevance ratios calculated by the sensor relevance ratio calculation processing as a guide before recording the calculated sensor importance in a sensor importance recorder.

According to another aspect of the invention, a sensor evaluation program for causing a computer connected to a network including a plurality of sensors, an analysis system having a service execution part for providing analysis service using sensor data obtained from at least one of the plurality of sensors, and a plurality of business systems for executing predetermined functions to perform processing and includes sensor reference degree calculation processing for calculating sensor reference degrees indicating the degrees of sensor data used by the service execution part to provide analysis service being referenced based on at least one of a number of business systems that referenced sensor data obtained from the sensors, an access state of business systems that referenced sensor data obtained from the sensors, and a performance state of business systems that referenced sensor data obtained from the sensors, and sensor importance calculation processing for calculating sensor importance using the sensor reference degrees calculated by the sensor reference degree calculation processing as a guide before recording the calculated sensor importance in a sensor importance recorder.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF THE DRAWINGS

FIG. 3 illustrates sensor relevance ratios calculated by a sensor relevance ratio calculator in the sensor evaluation system.

FIG. 4 illustrates example data recorded in an analysis importance recorder in the sensor evaluation system.

FIG. 5 illustrates example data recorded in a sensor importance recorder in the sensor evaluation system.

FIG. 10 illustrates example inventory data generated by the maintenance manager in the sensor evaluation system.

FIG. 15 is a diagram for illustrating sensor reference degrees calculated by the sensor reference degree calculator in the sensor evaluation system.

DETAILED DESCRIPTION OF THE EMBODIMENTS an example FIG. 1 illustrates a sensor evaluation system 1 according to an example embodiment together with the configuration of a whole system including the sensor evaluation system 1. The sensor evaluation system 1 shown in FIG. 1 is connected to a network N and An example illustrates a case in which the network N is the Internet, but the type of the network N is not specifically limited and may be Ethernet (registered trademark), wireless LAN, or other computer networks.

The network N has sensors $3a$ to $3c$ having sensor control parts $2a$ to $2c$ and analysis systems $4a$ and $4b$ connected thereto. The sensors $3a$ to $3c$ are devices that detect information on physical quantities (for example, light, pressure, displacements, temperature, and humidity), information on chemical quantities (for example, gases, ions, and biological substance), or information (for example, various log data, POS cash register information, and communication packet analysis information) generated by information processing and output detected information as sensor data. The sensors $3a$ to $3c$ are, for example, video cameras, printers, scanners, barcode readers of POS cash register, CGM (Consumer Generated Media) offering blog evaluation information, RFID (Radio Frequency Identification) tags, potentiometers, and thermocouples and the sensor type is not specifically limited.

An example case in which the sensor $3a$ is a printer, the sensor $3b$ is a barcode reader capable of reading barcodes attached to commodities, and the sensor $3c$ is a video camera set up in a store A is disclosed. More specifically, a case in which the sensor $3a$ outputs sensor data X1 in time series order indicating the number of printed tickets, the sensor $3b$ outputs sensor data X2 in time series order indicating the number of delivered items of a commodity B in the store A, and the sensor $3c$ outputs sensor data X3 in time series order indicating the number of customers in the store A is illustrated.

The analysis systems $4a$ and $4b$ have service execution parts $40a$ and $40b$ respectively. Each of the service execution parts $40a$ and $40b$ provides analysis service using sensor data obtained from at least one sensor of the sensors $3a$ to $3c$ to users. It can be assumed in an example embodiment that the service execution part $40a$ provides analysis service using the sensor data X1 to X3 in time series order to users. This analysis service is a service to analyze relationships between each of the number of printed tickets, the number of delivered items of the commodity B, and the number of customers in the store A and the amount of sales in the store A. It is also assumed in an example embodiment that the service execution part $40b$ provides analysis service using the sensor data X1 and X2 in time series order to users. This analysis service is a service to analyze relationships between each of the number of printed tickets and the number of delivered items of the commodity B, and the number of items of the commodity B in stock.

Figure 1:
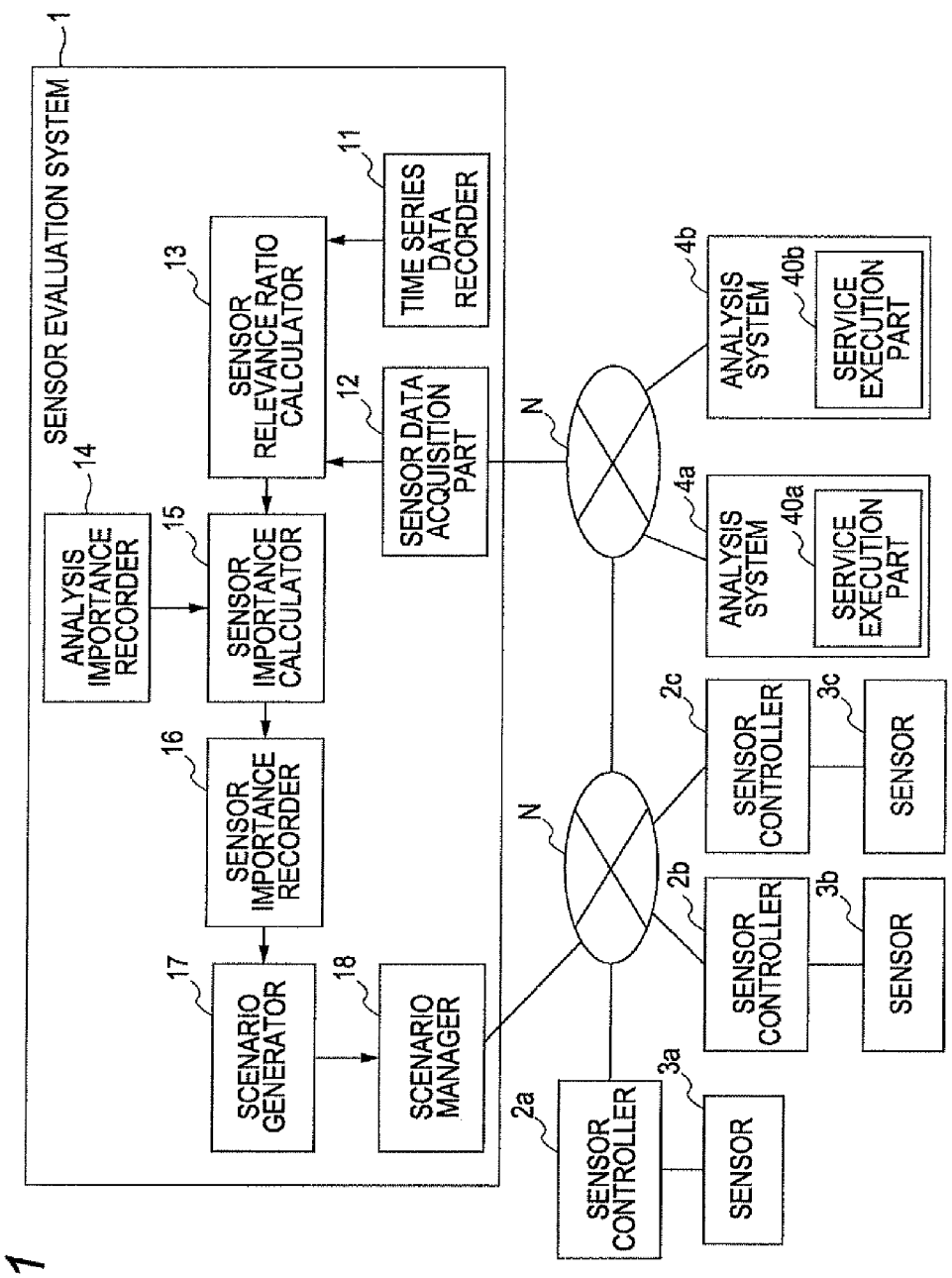
FIG. 1 illustrates a sensor evaluation system according to an example embodiment including the sensor evaluation system.

For simplification of illustration, FIG. 1 illustrates a case in which the three sensors $3a$ to $3c$ and the two analysis systems $4a$ and $4b$ are present, but any numbers of sensors and analysis systems may be connected to the network N. In addition to the sensor evaluation system 1, the sensors $3a$ to $3c$, and the analysis systems $4a$ and $4b$, for example, computers such as a WWW server, a DNS server, a DHCP server, and user terminals may be connected to the network N. Moreover, such computers may be equipped with a service execution part for providing analysis service using sensor data obtained from sensors.

The sensor evaluation system 1 includes a time series data recorder 11, a sensor data acquisition part 12, a sensor relevance ratio calculator 13, an analysis importance recorder 14, a sensor importance calculator 15, a sensor importance recorder 16, a scenario generator 17, and a scenario manager 18.

The time series data recorder 11 records identification data for identifying each of the analysis systems $4a$ and $4b$ and time series data associated with each piece of the identification data. Time series data is data showing changes with time of events having predetermined relations with the analysis service. Having predetermined relations can be defined as having some relationship with analysis results of the analysis service. That is, time series data is not specifically limited and, for example, may be analysis results of the analysis service provided by the analysis system $4a$ and $4b$ or data entered by an administrator of the sensor evaluation system 1 if the time series data shows changes with time of events having predetermined relations with the analysis service provided by the analysis systems $4a$ and $4b$. For example, the service execution part $40a$ provides a service analyzing relationships between each of the number of printed tickets, the number of delivered items of the commodity B, and the number of customers in the store A and the amount of sales in the store A and thus, for example, changes in the amount of sales of the store A and changes in the number of items of the commodity B in stock sold by the store A can be selected as time series data for the analysis system $4a$.

In the time series data recorder 11 according to an example embodiment, identification data "001" indicates the analysis system $4a$ and time series data Y1 associated with the identification data are recorded. Also in the time series data recorder 11, identification data "002" indicates the analysis system $4b$ and time series data Y2 associated with the identification data are recorded.

Figure 2A:
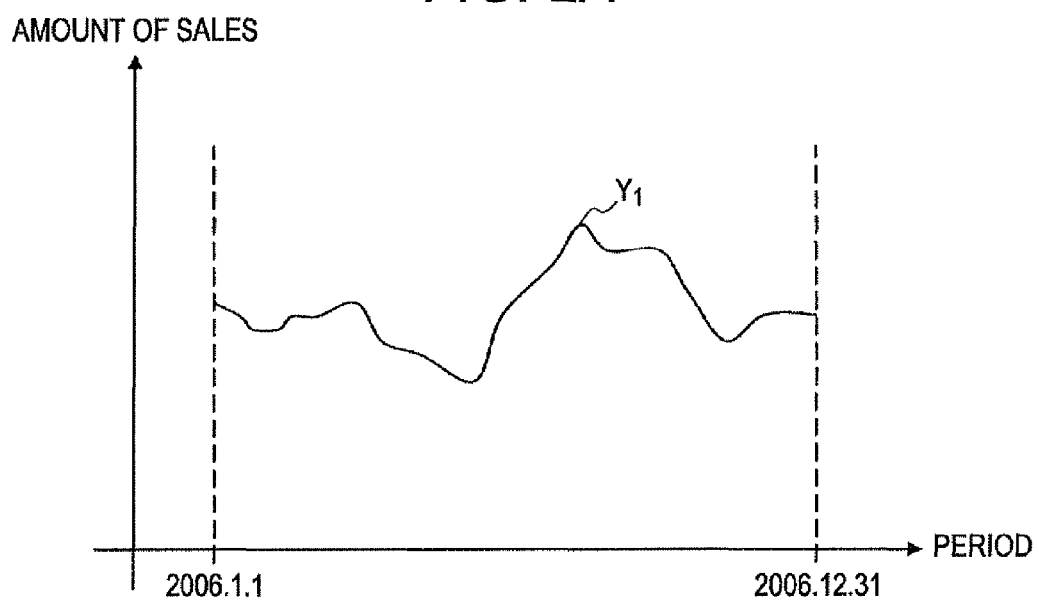
FIGS. 2A and 2B illustrate an example of time series data recorded in a time series data recorder in the sensor evaluation system.
Figure 2B:
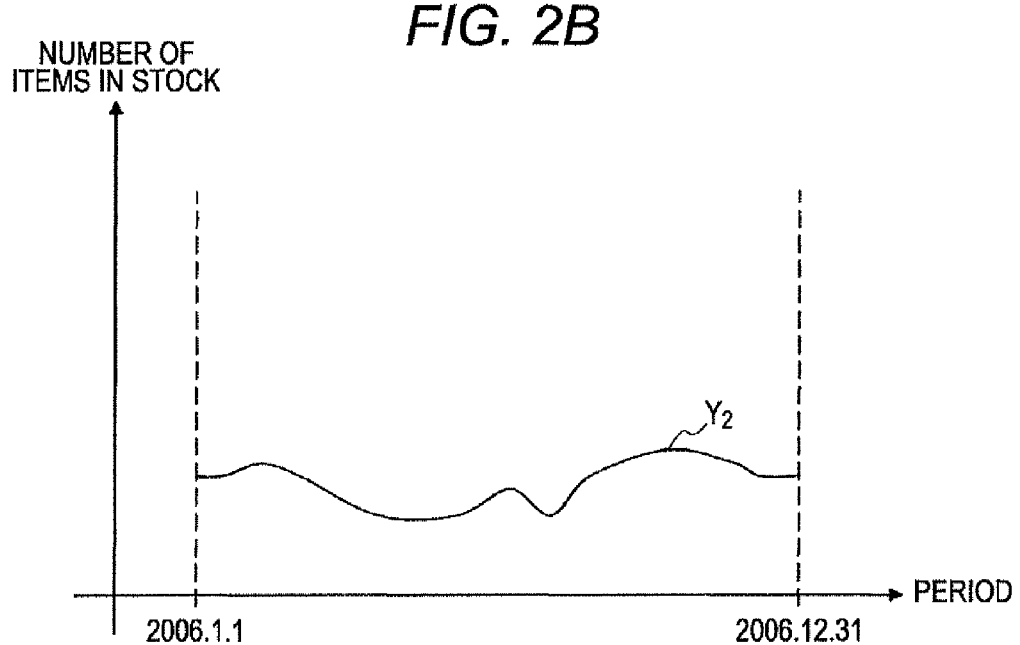

FIG. 2 shows examples of the time series data Y1 and Y2 recorded in the time series data recorder 11 according to an example embodiment. As shown in FIG. 2($a$), the time series data Y1 is data showing the day-to-day amount of sales of the store A from Jan. 1, 2006 to Dec. 31, 2006. That is, the time series data Y1 is data showing changes with time of an event having predetermined relations with the analysis service provided by the service execution part $40a$ of the analysis system $4a$. Also, as shown in FIG. 2($b$), the time series data Y2 is data showing the day-to-day number of items of the commodity B in stock in the store A from Jan. 1, 2006 to Dec. 31, 2006. That is, the time series data Y2 is data showing changes with time of an event having predetermined relations with the analysis service provided by the service execution part $40b$ of the analysis system $4b$.

The sensor data acquisition part 12 acquires sensor data used by the service execution parts $40a$ and $40b$ of the analysis systems $4a$ and $4b$ to provide analysis service from the analysis systems $4a$ and $4b$ respectively. In an example embodiment, the service execution part $40a$ of the analysis system $4a$ provides analysis service to users by using the time series sensor data X1 to X3 and thus, the sensor data acquisition part 12 acquires the sensor data X1 to X3 from the analysis system $4a$. Also in an example embodiment, the service execution part $40b$ of the analysis system $4b$ provides analysis service to users by using the time series sensor data X1 and X2 and thus, the sensor data acquisition part 12 acquires the sensor data X1 and X2 from the analysis system $4b$.

The sensor relevance ratio calculator 13 calculates sensor relevance ratios indicating the relevance ratios of the sensor data X1 to X3 to the time series data Y1 by comparing changes with time of the event shown by the time series data Y1 and time series records of the sensor data X1 to X3 used by the service execution part $40a$ to provide analysis service in periods having the same width. More specifically, the sensor relevance ratio calculator 13 first references the time series data recorder 11 to extract the time series data Y1 associated with the identification data "001" indicating the analysis system $4a$ from the time series data recorder 11. The sensor relevance ratio calculator 13 also acquires the sensor data X1 to X3 used by the service execution part 40a of the analysis system 4a to provide analysis service from the sensor data acquisition part 12.

The sensor relevance ratio calculator 13 calculates correlation coefficients indicating correlations between changes with time of the event shown by the time series data Y1 and each of a time series record of the sensor data X1 indicating the number of printed tickets, that of the sensor data X2 indicating the number of delivered items of the commodity B in the store A, and that of the sensor data X3 indicating the number of customers in the store A in the same period. The correlation coefficient is generally a coefficient taking a real number between −1 to +1. There is a positive correlation when the coefficient approaches +1, a negative correlation when the coefficient approaches −1, and a weak correlation when the coefficient approaches 0. The correlation coefficient is generally represented by dividing a covariance of X and Y by a standard deviation of each of X and Y. Based on calculated correlation coefficients, the sensor relevance ratio calculator 13 calculates sensor relevance ratios. In an example embodiment, the sensor relevance ratio calculator 13 adopts the calculated correlation coefficients as the sensor relevance ratios unchanged.

Similarly, the sensor relevance ratio calculator 13 calculates sensor relevance ratios indicating the relevance ratios of the sensor data X1 and X2 to the time series data Y2 by comparing changes with time of the event shown by the time series data Y2 and time series records of the sensor data X1 and X2 used by the service execution part 40b to provide analysis service in the same period. FIG. 3 is a diagram for illustrating sensor relevance ratios calculated by the sensor relevance ratio calculator 13 according to an example embodiment. It can be assumed in an example embodiment that, as shown in FIG. 3, the sensor relevance ratio calculator 13 calculates for the analysis system 4a the sensor relevance ratio of "0.6" for the sensor 3a, that of "0.7" for the sensor 3b, and that of "0.9" for the sensor 3c. It is also assumed that the sensor relevance ratio calculator 13 calculates for the analysis system 4b the sensor relevance ratio of "0.1," for the sensor 3a and that of "0.7" for the sensor 3b.

In an example embodiment, the sensor relevance ratio of the sensor 3c is "0.9" in the analysis system 4a and therefore, the sensor data X3 in time series order showing the number of customers in the store A can be considered to be data directly affecting the time series data Y1 showing the day-to-day amount of sales of the store A. That is, the time series data Y1 can be considered to be data linked to the sensor data X3 showing the number of customers in the store A. In other words, if the number of customers in the store A increases, the amount of sales also increases, and if the number of customers in the store A decreases, the amount of sales also decreases. On the other hand, the sensor relevance ratio of the sensor 3a is "0.1", in the analysis system 4b and therefore, the sensor data X1 in time series order showing the number of printed tickets can be considered to be data hardly affecting the time series data Y2 showing the day-to-day number of items of the commodity B in stock in the store A. That is, the time series data Y2 can be considered to be data hardly linked to the sensor data X1 in time series order showing the number of printed tickets. In other words, the number of items of the commodity B in stock increases or decreases regardless of the number of printed tickets.

The analysis importance recorder 14 records identification data for identifying each of the analysis systems 4a and 4b and importance of the analysis systems 4a and 4b associated with each piece of the identification data. FIG. 4 shows a diagram exemplifying data recorded in the analysis importance recorder 14 according to an example embodiment. As shown in FIG. 4, identification data "001" indicating the analysis system 4a and the importance "3" of the analysis system 4a associated with the identification data are recorded in the analysis importance recorder 14. Also, identification data "002" indicating the analysis system 4b and the importance "1" of the analysis system 4b associated with the identification data are recorded in the analysis importance recorder 14. The importance of the analysis systems 4a and 4b recorded in the analysis importance recorder 14 is preset by the administrator of the sensor evaluation system 1. That is, the administrator of the sensor evaluation system 1 sets the importance of an analysis system providing important analysis service high and that of an analysis system providing not so important analysis service low.

The sensor importance calculator 15 calculates sensor importance based on the sensor relevance ratio calculated by the sensor relevance ratio calculator 13 for each of the analysis systems 4a and 4b and the analysis system importance recorded in the analysis importance recorder 14 for each of the analysis systems 4a and 4b. More specifically, the sensor importance calculator 15 first acquires the sensor relevance ratio of "0.6" for the sensor 3a, that of "0.7" for the sensor 3b, and that of "0.9" for the sensor 3c in the analysis system 4a from the sensor relevance ratio calculator 13. The sensor importance calculator 15 also references the analysis importance recorder 14 to extract the importance of "3" of the analysis system 4a associated with the identification data "001" indicating the analysis system 4a. The sensor importance calculator 15 multiplies each of the sensor relevance ratio of "0.6" of the sensor 3a, that of "0.7" of the sensor 3b, and that of "0.9" of the sensor 3c in the analysis system 4a by the importance of "3" of the analysis system 4a. The multiplication results in a calculation result of "1.8" for the sensor 3a, that of "2.1" for the sensor 3b, and that of "2.7" for the sensor 3c in the analysis system 4a.

Similarly, the sensor importance calculator 15 acquires the sensor relevance ratio of "0.1" for the sensor 3a and that of "0.7" for the sensor 3b in the analysis system 4b from the sensor relevance ratio calculator 13. The sensor importance calculator 15 also references the analysis importance recorder 14 to extract the importance of "1" of the analysis system 4b associated with the identification data "002" indicating the analysis system 4b. The sensor importance calculator 15 multiplies each of the sensor relevance ratio of "0.1" of the sensor 3a and that of "0.7" of the sensor 3b in the analysis system 4b by the importance of "1" of the analysis system 4b. The multiplication results in a calculation result of "0.1" for the sensor 3a and that of "0.7" for the sensor 3b in the analysis system 4b.

The sensor importance calculator 15 adopts a sum of the calculation result of "1.8" for the sensor 3a in the analysis system 4a and that of "0.1" for the sensor 3a in the analysis system 4b as the sensor importance of the sensor 3a. That is, the sensor importance of the sensor 3a will be "1.9". The sensor importance calculator 15 also adopts the sum of the calculation result of "2.1" for the sensor 3b in the analysis system 4a and that of "0.7" for the sensor 3b in the analysis system 4b as the sensor importance of the sensor 3b. That is, the sensor importance of the sensor 3b will be "2.8". Further, the sensor importance calculator 15 also adopts the calculation result of "2.7" for the sensor 3c in the analysis system 4a as the sensor importance of the sensor 3c. The sensor importance calculator 15 records the calculated sensor importance in the sensor importance recorder 16.

An example in which the sensor importance calculator 15 adopts the sum of a calculation result in the analysis system 4a and that in the analysis system 4b as the sensor importance is described above, but the calculation of the sensor importance is not limited to this. For example, the product of a calculation result in the analysis system 4a and that in the analysis system 4b may be adopted as the sensor importance. That is, the calculation method of the sensor importance is not specifically limited if sensor importance can be calculated based on a sensor relevance ratio in the analysis system 4a and that in the analysis system 4b.

The sensor importance recorder 16 records sensor importance calculated by the sensor importance calculator 15. FIG. 5 exemplifies data recorded in the sensor importance recorder 16 according to an example embodiment. As shown in FIG. 5, the sensor importance of "1.9" for the sensor 3a, that of "2.8" for the sensor 3b, and that of "2.7" for the sensor 3c are recorded in the sensor importance recorder 16.

The scenario generator 17 determines operations of the sensors 3a to 3c based on the sensor importance recorded in the sensor importance recorder 16 and generates scenario data showing operations of the sensors 3a to 3c. In an example embodiment, a case in which the scenario generator 17 generates scenario data that determines time zones in which operations of the sensors 3a to 3c are in a standby state and those of the sensors 3a to 3c are in an operating state in the times zones of 8:00 to 18.00 will be described. The standby state indicates a sleep state in which operations of the sensor control parts 2a to 2c provided with the sensors 3a to 3c are temporarily stopped. The operating state indicates that operations of the sensor control parts 2a to 2c provided with the sensors 3a to 3b are in a normal operating state.

More specifically, the scenario generator 17 first extracts the sensor importance recorded in the sensor importance recorder 16. In an example embodiment, the scenario generator 17 extracts the sensor importance of "1.9" for the sensor 3a, that of "2.8" for the sensor 3b, and that of "2.7" for the sensor 3c. The scenario generator 17 assigns the shortest standby time to the sensor 3b whose importance is the highest among the three sensors 3a to 3c. The scenario generator 17 also assigns the longest standby time to the sensor 3a whose importance is the lowest among the three sensors 3a to 3c. The scenario generator 17 assigns a standby time between the standby time assigned to the sensor 3c and that assigned to the sensor 3b to the sensor 3c. The standby time assigned to each of the sensors 3a to 3c is recorded in a memory (not shown) of the scenario generator 17 in advance. Time zones in which a standby time should be assigned are recorded in the memory (not shown) of the scenario generator 17 in descending order or ascending order of sensor importance.

Figure 6:
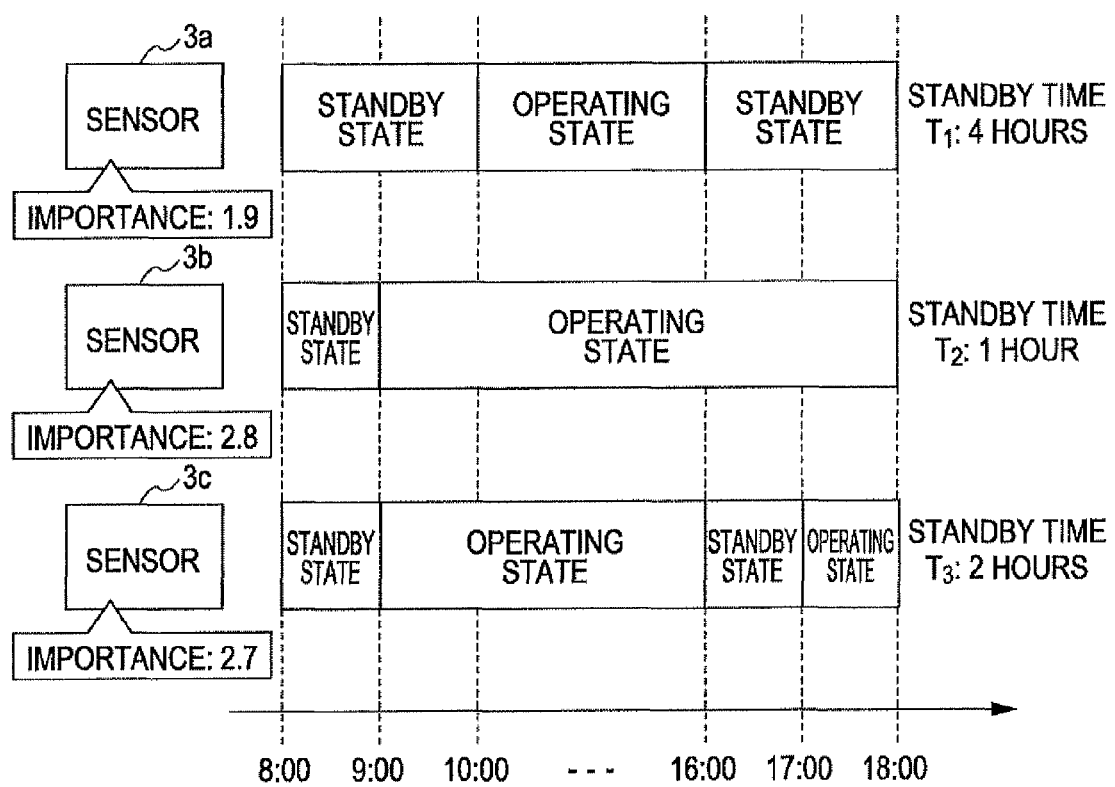
FIG. 6 illustrates example scenario data generated by a scenario generator in the sensor evaluation system.

FIG. 6 illustrates example scenario data generated by the scenario generator 17 according to an example embodiment. An arrow in FIG. 6 indicates the axis of time. As shown in FIG. 6, the sensor 3a is in a standby state in the time zones of 8:00 to 10:00 and 16:00 to 18:00 and in an operating state in other time zones. The sensor 3b is in a standby state in the time zone of 8:00 to 9:00 and in an operating state in other time zones. Further, the sensor 3c is in a standby state in the time zones of 8:00 to 9:00 and 16:00 to 17:00 and in an operating state in other time zones. That is, the sensor 3a is the lowest sensor in importance among the three sensors 3a to 3c and thus, has a longest standby time T1 (four hours) assigned among the three sensors 3a to 3c in the scenario data shown in FIG. 6. The sensor 3b, on the other hand, is the highest sensor in importance among the three sensors 3a to 3c and thus, has a shortest standby time T2 (one hour) assigned among the three sensors 3a to 3c in the scenario data shown in FIG. 6. The sensor 3c has a standby time T3 (two hours) between the standby time T1 of the sensor 3a and the standby time T2 of the sensor 3b assigned in the scenario data shown in FIG. 6. The scenario generator 17 outputs generated scenario data to the scenario manager 18.

The scenario manager 18 generates control instructions to cause the sensors 3a to 3c to perform operations of the sensors 3a to 3c indicated by scenario data generated by the scenario generator 17 and transmits control signals indicated by the generated control instructions to the sensors 3a to 3c. More specifically, the scenario manager 18 causes each of the sensors 3a to 3c to perform as specified by scenario data by transmitting control signals to the sensor control parts 2a to 2c provided with the sensors 3a to 3c. For example, the sensor control part 2a controls the sensor 3a based on control signals transmitted from the scenario manager 18 so that the sensor 3a is in a standby state in the time zones of 8:00 to 10:00 and 16:00 to 18:00 and in an operating state in other time zones.

The sensor evaluation system 1 described above is realized by installing a program in any computer such as a personal computer. That is, the sensor data acquisition part 12, the sensor relevance ratio calculator 13, the sensor importance calculator 15, the scenario generator 17, and the scenario manager 18 described above are embodied by a CPU of the computer being operated according to a program realizing these functions. Therefore, a program for realizing functions of the sensor data acquisition part 12, the sensor relevance ratio calculator 13, the sensor importance calculator 15, the scenario generator 17, and the scenario manager 18 or a recording medium recording such a program is also an embodiment of an example invention. The time series data recorder 11, the analysis importance recorder 14, and the sensor importance recorder 16 are embodied by a built-in storage device of a computer or a storage device accessible from the computer.

Next, operations of the sensor evaluation system 1 according to the above configuration will be described with reference to FIG. 7.

Figure 7:
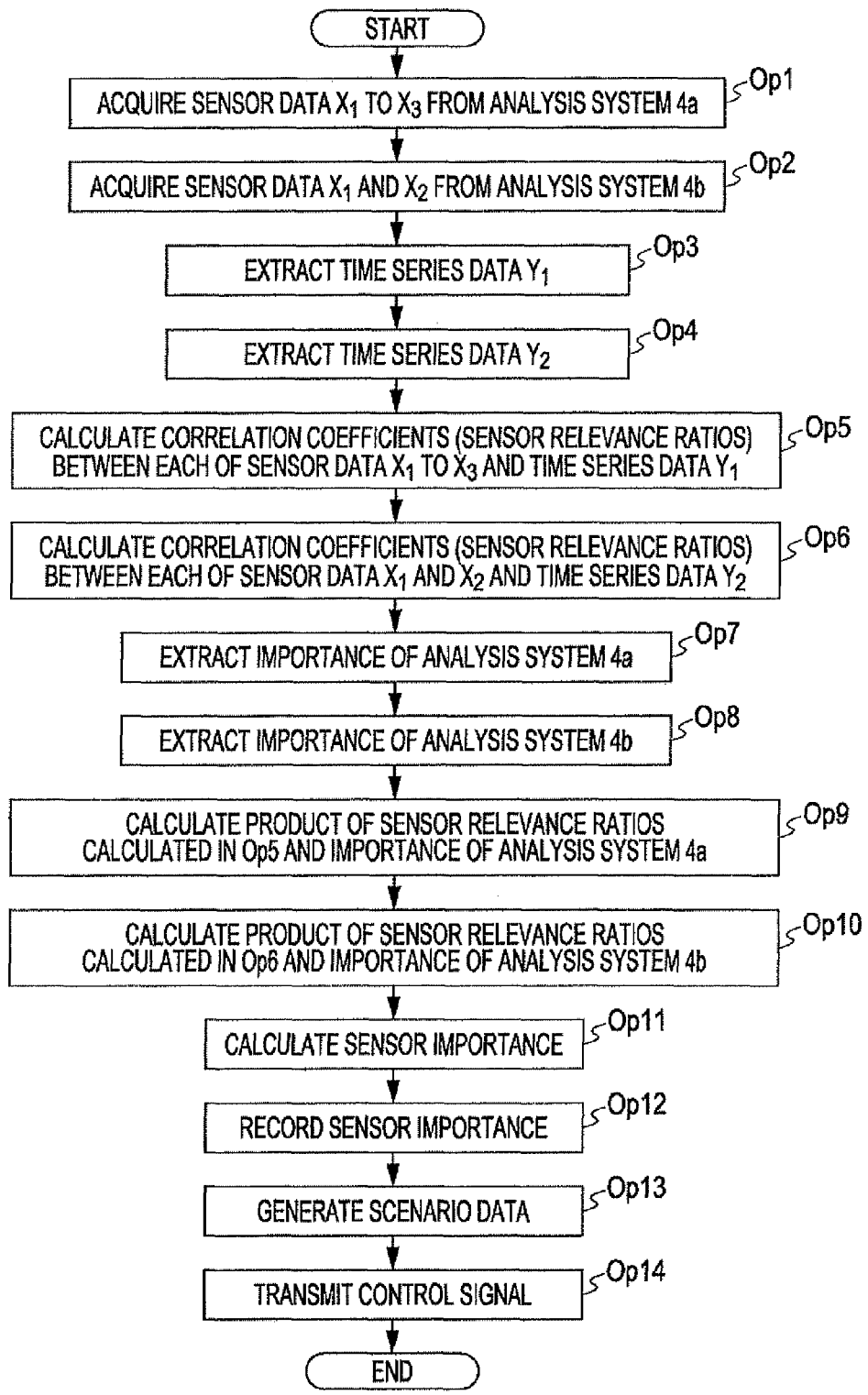
FIG. 7 illustrates example operations of the sensor evaluation system.

FIG. 7 illustrates example operations of the sensor evaluation system 1. That is, the sensor data acquisition part 12 acquires sensor data used by the service execution parts 40a and 40b of the analysis systems 4a and 4b to provide analysis service from the analysis systems 4a and 4b respectively. More specifically, the sensor data acquisition part 12 acquires the sensor data X1 in time series order indicating the number of printed tickets, the sensor data X2 in time series order indicating the number of delivered items of the commodity B in the store A, and the sensor data X3 indicating the number of customers in the store A from the analysis system 4a (Op 1). The sensor data acquisition part 12 also acquires the sensor data X1 in time series order indicating the number of printed tickets and the sensor data X2 in time series order indicating the number of delivered items of the commodity B in the store A from the analysis system 4b (Op 2).

The sensor relevance ratio calculator 13 references the time series data recorder 11 to extract the time series data Y1 associated with the identification data "001" indicating the analysis system 4a from the time series data recorder 11 (Op 3). The sensor relevance ratio calculator 13 also references the time series data recorder 11 to extract the time series data Y2 associated with the identification data "002" indicating the analysis system 4b from the time series data recorder 11 (Op 4). The sensor relevance ratio calculator 13 calculates correlation coefficients indicating correlations between changes with time of an event shown by the time series data Y1 extracted in Op 3 and time series records of the sensor data X1 to X3 acquired in Op 1 in the same period. The sensor relevance ratio calculator 13 adopts the calculated correlation coefficients as the sensor relevance ratios unchanged (Op 5).

The sensor relevance ratio calculator 13 also calculates correlation coefficients indicating correlations between changes with time of an event shown by the time series data Y2 extracted in Op 4 and time series records of the sensor data X1 and X2 acquired in Op 2 in the same period. The sensor relevance ratio calculator 13 adopts the calculated correlation coefficients as the sensor relevance ratios unchanged (Op 6).

The sensor importance calculator 15 references the analysis importance recorder 14 to extract the importance of "3" of the analysis system 4a associated with the identification data "001" indicating the analysis system 4a (Op 7). The sensor importance calculator 15 also references the analysis importance recorder 14 to extract the importance of "1" of the analysis system 4b associated with the identification data "002" indicating the analysis system 4b (Op 8). The sensor importance calculator 15 calculates a product of the sensor relevance ratio calculated in Op 5 and the importance "3" of the analysis system 4a extracted in Op 7 (Op 9). The sensor importance calculator 15 also calculates a product of the sensor relevance ratio calculated in Op 6 and the importance "1" of the analysis system 4b extracted in Op 8 (Op 10). The sensor importance calculator 15 calculates a sum of the sensor relevance ratio calculated in Op 9 and that calculated in Op 10. The sensor importance calculator 15 adopts the calculated sum as the sensor importance (Op 11). The sensor importance calculator 15 records the sensor importance calculated in Op 11 in the sensor importance recorder 16 (Op 12).

The scenario generator 17 determines operations of the sensors 3a to 3c based on the sensor importance recorded in the sensor importance recorder 16 in Op 12 and generates scenario data showing operations of the sensors 3a to 3c (Op 13). The scenario manager 18 generates control instructions to cause the sensors 3a to 3c to perform operations of the sensors 3a to 3c indicated by scenario data generated in Op 13 and transmits control signals indicated by the generated control instructions to the sensors 3a to 3c (Op 14).

According to the sensor evaluation system 1 according to an example embodiment, as described above, time series data showing changes with time of events having predetermined relations with analysis service is recorded in the time series data recorder 11 by associating with analysis systems. The sensor relevance ratio calculator 13 calculates sensor relevance ratios indicating the relevance ratios of sensor data to the time series data by comparing changes with time of events indicated by the time series data and time series records of sensor data used by the service execution parts 40a and 40b to provide the analysis service in the same period. Thus, by calculating sensor relevance ratios, the sensor relevance ratios are obtained as data quantitatively showing to which extent sensor data used by the service execution parts 40a and 40b to provide the analysis service is related to the time series data showing changes with time of events having predetermined relations with the analysis service. That is, the sensor relevance ratios are obtained as data to be a guide to judging how important sensor data used by the service execution parts 40a and 40b to provide the analysis service is to the analysis service. Thus, the sensor importance calculator 15 can calculate sensor importance using the calculated sensor relevance ratios as a guide before recording the calculated sensor importance in the sensor importance recorder 16. Accordingly, the sensor importance can be calculated without requiring much time even if a sensor or an analysis system is dynamically added to/deleted from a network.

The above concrete examples are only a preferred embodiment of the sensor evaluation system 1 according to an example invention and, for example, various modifications of the calculation method of sensor relevance ratios by the sensor relevance ratio calculator 13 and usage of the sensor importance recorded in the sensor importance recorder 16 can be made.

Another calculation method of sensor relevance ratios by the sensor relevance ratio calculator 13 will be descried as an example. That is, the sensor relevance ratio calculator 13 performs regression analysis of each of the sensor data X1 in time series order indicating the number of printed tickets, the sensor data X2 indicating the number of delivered items of the commodity B in the store A, and the sensor data X3 indicating the number of customers in the store A and the time series data Y1 for the analysis system 4a. In other words, the sensor relevance ratio calculator 13 calculates each of regression coefficients $\alpha 1$ to $\alpha 3$ so that $\beta$ in (Formula 1) shown below becomes minimal. The sensor relevance ratio calculator 13 adopts the calculated regression coefficients $\alpha 1$ to $\alpha 3$ as sensor relevance ratios unchanged. That is, the sensor relevance ratio calculator 13 adopts the regression coefficient $\alpha 1$ as the sensor relevance ratio of the sensor 3a, the regression coefficient $\alpha 2$ as the sensor relevance ratio of the sensor 3b, and the regression coefficient $\alpha 3$ as the sensor relevance ratio of the sensor 3c for the analysis system 4a.

$$Y1 = \alpha 1 \times X1 + \alpha 2 \times X2 \times \alpha 2 + \alpha 3 \times X3 + \beta \qquad \text{(Formula 1)}$$

Similarly, the sensor relevance ratio calculator 13 performs regression analysis of each of the sensor data X1 in time series order indicating the number of printed tickets and the sensor data X2 indicating the number of delivered items of the commodity B in the store A, and the time series data Y2 for the analysis system 4b. In other words, the sensor relevance ratio calculator 13 calculates each of regression coefficients $\alpha 4$ and $\alpha 5$ so that $\gamma$ in (Formula 2) shown below becomes minimal. The sensor relevance ratio calculator 13 adopts the calculated regression coefficients $\alpha 4$ and $\alpha 5$ as sensor relevance ratios unchanged. That is, the sensor relevance ratio calculator 13 adopts the regression coefficient $\alpha 4$ as the sensor relevance ratio of the sensor 3a and the regression coefficient $\alpha 5$ as the sensor relevance ratio of the sensor 3b for the analysis system 4b.

$$Y2 = \alpha 4 \times X1 + \alpha 5 \times X2 + \gamma \qquad \text{(Formula 2)}$$

When the sensor relevance ratio calculator 13 performs regression analysis using the above (Formula 1), it is preferable that the sensor data X1 to X3 be normalized. Similarly, when the sensor relevance ratio calculator 13 performs regression analysis using the above (Formula 2), it is preferable that the sensor data X1 and X2 be normalized. Normalization can be defined as a conversion so that the average of the sensor data X1 to X3 becomes 0 and the dispersion becomes 1. Accordingly, even if the sensor data X1 to X3 is data represented in different measures, for example, the sensor data X1 to X3 can be converted into data represented in the same measures by normalizing the sensor data X1 to X3.

An example in which the sensor relevance ratio calculator 13 uses regression analysis to calculate sensor relevance ratios is described above, but the analysis method is not limited to this. For example, the sensor relevance ratio calculator 13 may use the ARIMA model, state transition model, factor analysis, principal component analysis, or analysis of covariance structure to calculate sensor relevance ratios.

Figure 8:
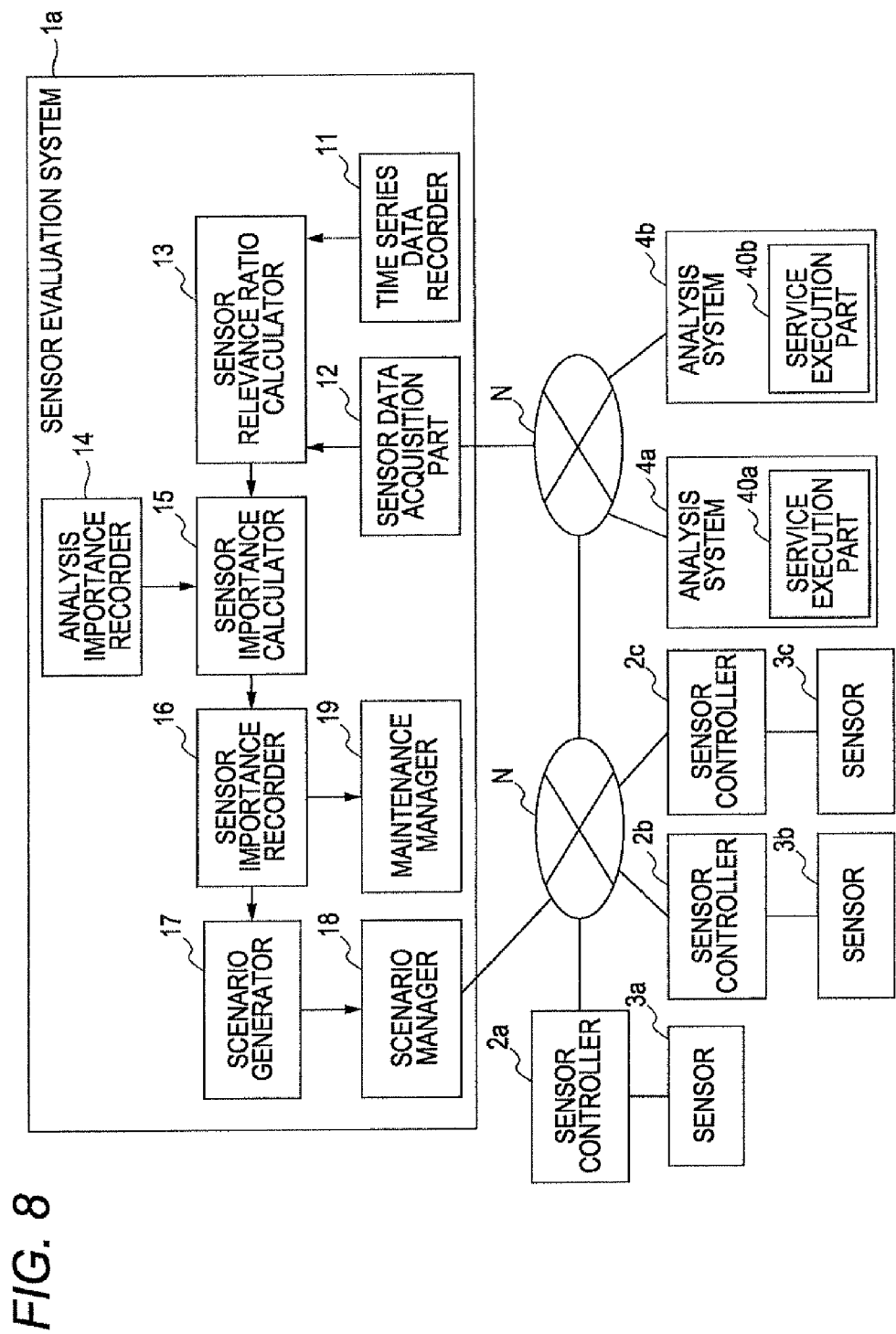
FIG. 8 illustrates a sensor evaluation system according to an example embodiment including the sensor evaluation system.

FIG. 8 illustrates a sensor evaluation system 1a according to the second modification together with the configuration of a whole system including the sensor evaluation system 1a. That is, the sensor evaluation system 1a according to the second modification has a maintenance manager 19 in addition to the sensor evaluation system 1 shown in FIG. 1. In FIG.

8, the same reference numerals are attached to components having the same functions as those in FIG. 1 and a detailed description thereof is omitted.

The maintenance manager 19 generates a maintenance schedule for maintaining the sensors 3a to 3c based on sensor importance recorded in the sensor importance recorder 16. In the second modification, a case in which the maintenance manager 19 generates a maintenance schedule for determining time zones when the sensors 3a to 3c are inspected in the time zones of 8:00 to 18:00 will be described.

More specifically, the maintenance manager 19 first extracts sensor importance recorded in the sensor importance recorder 16. In an example embodiment, the maintenance manager 19 extracts the sensor importance of "1.9" for the sensor 3a, that of "2.8" for the sensor 3b, and that of "2.7" for the sensor 3c. The maintenance manager 19 assigns the longest inspection time to the sensor 3b whose importance is the highest among the three sensors 3a to 3c. The maintenance manager 19 also assigns the shortest inspection time to the sensor 3a whose importance is the lowest among the three sensors 3a to 3c. The maintenance manager 19 assigns an inspection time between the inspection time assigned to the sensor 3a and that assigned to the sensor 3b to the sensor 3c. The inspection time assigned to each of the sensors 3a to 3c is recorded in a memory (not shown) of the maintenance manager 19 in advance.

Figure 9:
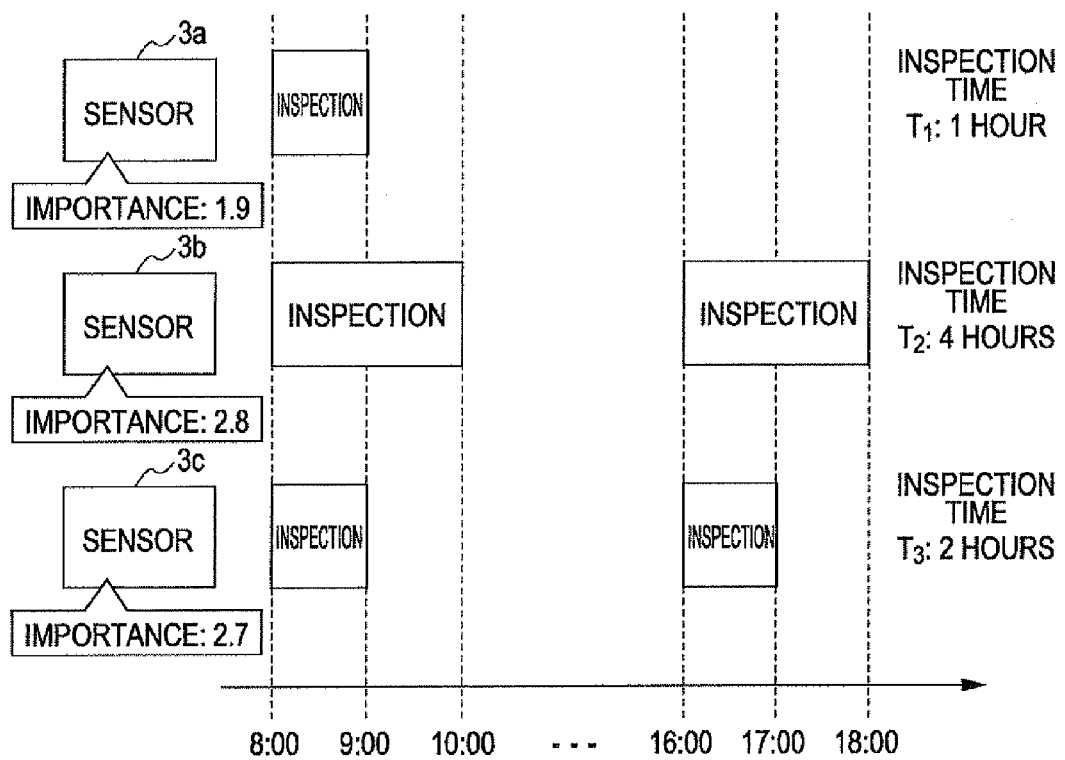
FIG. 9 illustrates example a maintenance schedule generated by a maintenance manager in the sensor evaluation system.

FIG. 9 illustrates example a maintenance schedule generated by the maintenance manager 19 according to the second modification. An arrow in FIG. 9 indicates the axis of time. As shown in FIG. 9, the sensor 3a is inspected in the time zone of 8:00 to 9:00. The sensor 3b is inspected in the time zones of 8:00 to 10:00 and 16:00 to 18:00. Further, the sensor 3c is inspected in the time zones of 8:00 to 9:00 and 16:00 to 17:00. That is, the sensor 3a is the lowest sensor in importance among the three sensors 3a to 3c and thus, has a shortest inspection time T1 (one hour) assigned among the three sensors 3a to 3c in the maintenance schedule shown in FIG. 9. The sensor 3b, on the other hand, is the highest sensor in importance among the three sensors 3a to 3c and thus, has a longest inspection time T2 (four hours) assigned among the three sensors 3a to 3c in the maintenance schedule shown in FIG. 9. The sensor 3c has an inspection time T3 (two hours) between the inspection time T1 of the sensor 3a and the inspection time T2 of the sensor 3b assigned in the maintenance schedule shown in FIG. 9. Accordingly, an administrator can maintain the sensors according to a generated maintenance schedule.

The maintenance manager 19 also generates inventory data indicating the numbers of items of the sensors 3a to 3c based on the sensor importance recorded in the sensor importance recorder 16. FIG. 10 illustrates example inventory data generated by the maintenance manager 19 according to the second modification to indicate the numbers of items in stock. As shown in FIG. 10, the sensor 3a has five items assigned. The sensor 3b has 20 items assigned. Further, the sensor 3c has 10 items assigned. That is, the sensor 3a is the lowest sensor in importance among the three sensors 3a to 3c and thus, has the smallest number (5) of items assigned in the inventory data shown in FIG. 10. The sensor 3b, on the other hand, is the highest sensor in importance among the three sensors 3a to 3c and thus, has the greatest number (20) of items assigned in the inventory data shown in FIG. 10. The sensor 3c has 10 items, which is between five items of the sensor 3a and 20 items of the sensor 3b, assigned in the inventory data shown in FIG. 10. Accordingly, the administrator can adjust inventory of sensors according to generated inventory data.

Figure 11:
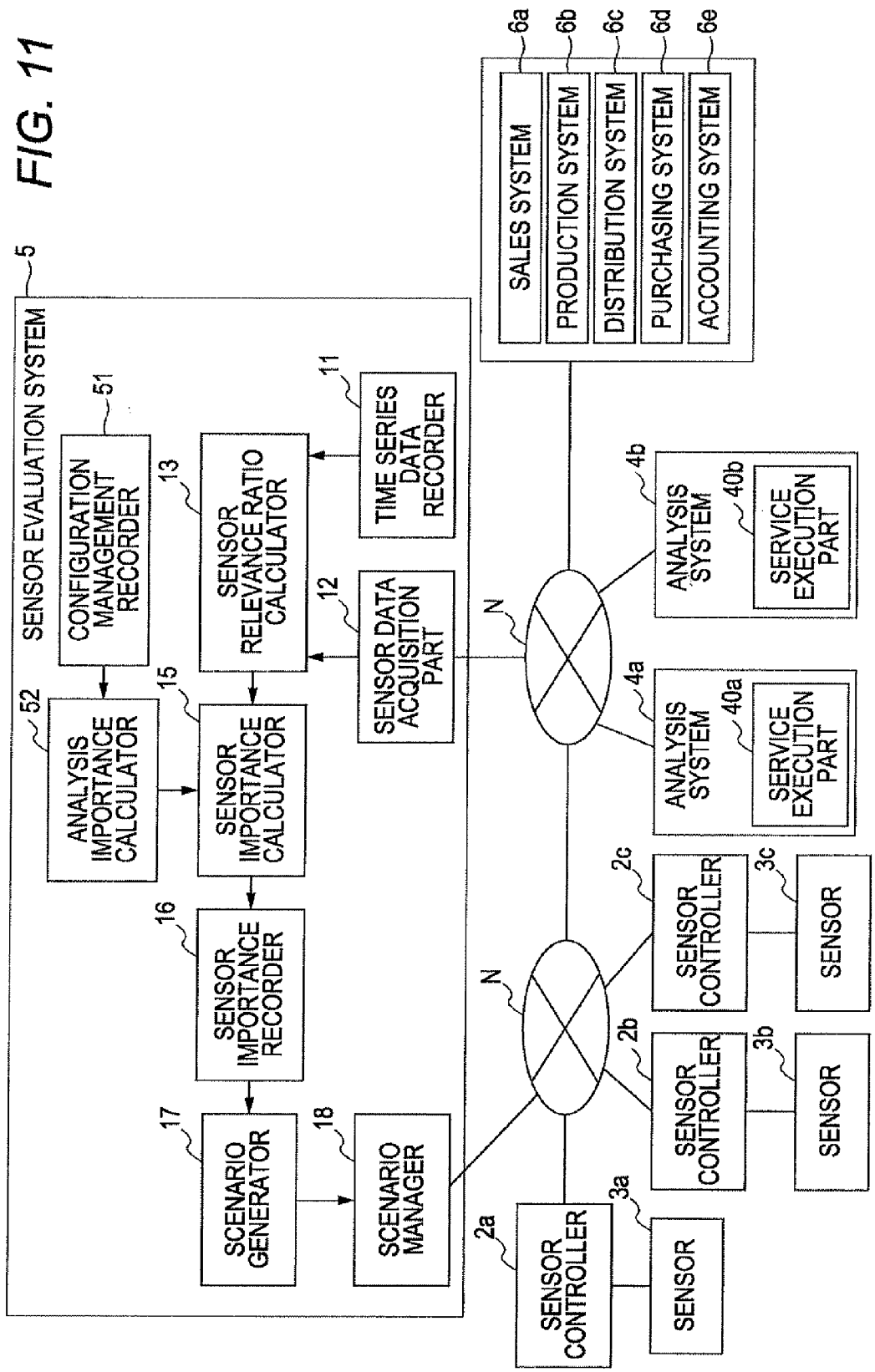
FIG. 11 illustrates the configuration of a sensor evaluation system according to an example embodiment of an example invention including the sensor evaluation system.

FIG. 11 illustrates a sensor evaluation system 5 according to an example embodiment together with the configuration of a whole system including the sensor evaluation system 5. That is, the sensor evaluation system 5 according to an example embodiment has a configuration management recorder 51 and an analysis importance calculator 52, in place of the analysis importance recorder 14 shown in FIG. 1. Moreover, a plurality of business systems 6a to 6e is further connected to a network N according to an example embodiment. Here, the sales system 6a is a system for managing sales of products. The production system 6b is a system for managing production of products. The distribution system 6c is a system for managing physical distribution of products. The purchasing system 6d is a system for managing purchase of products. The accounting system 6e is a system for managing financial conditions of stores. FIG. 11 shows a case in which the five business systems 6a to 6e are present to simplify a description, but any number of business systems can be connected to the network N. In FIG. 11 the same reference numerals are attached to components having the same functions as those in FIG. 1 and a detailed description thereof is omitted.

Figure 12:
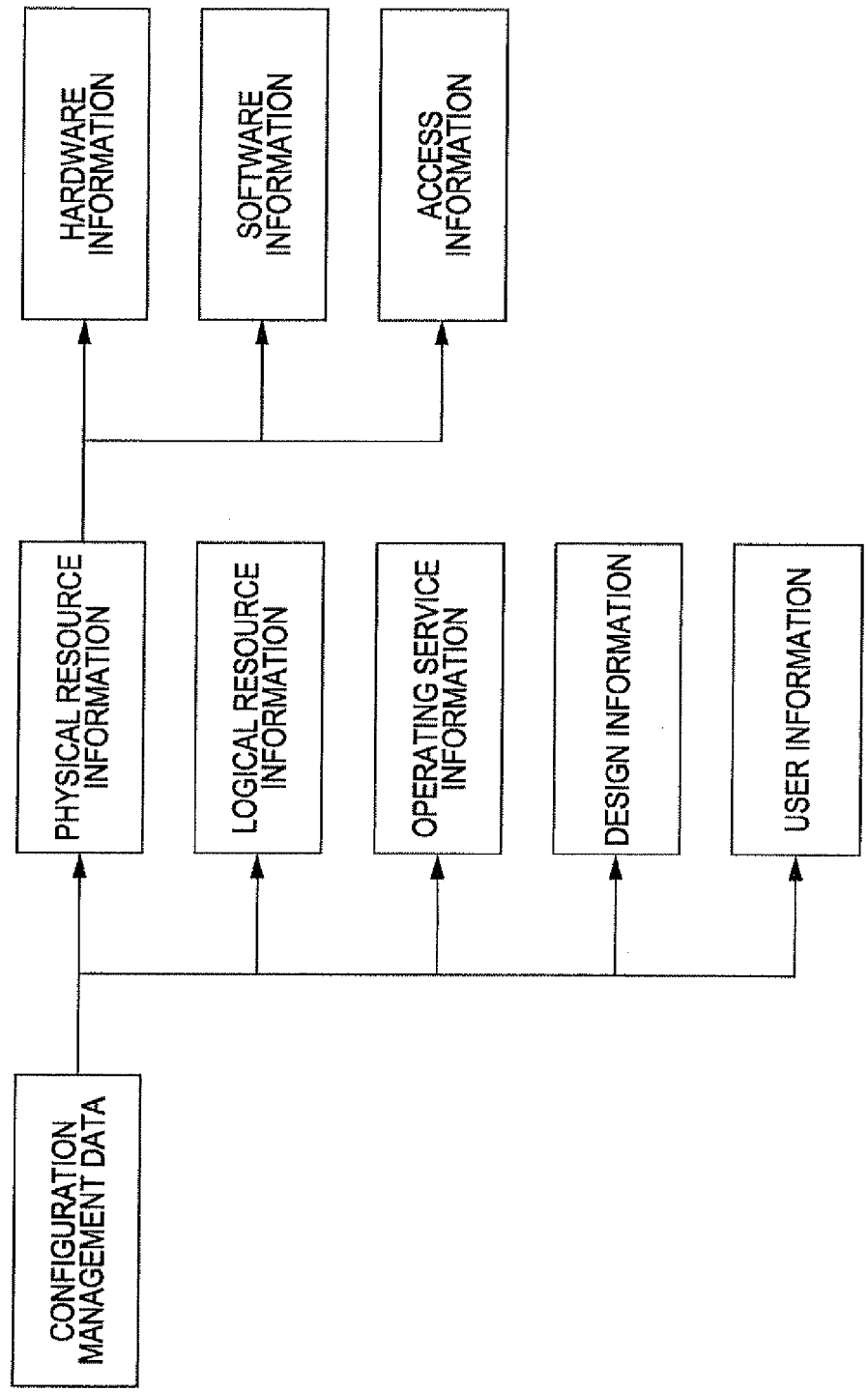
FIG. 12 illustrates example configuration management data recorded in a configuration management recorder in the sensor evaluation system.

The configuration management recorder 51 records configuration management data including at least one of the number of the business systems 6a to 6e that referenced time series data, an access state of the business systems 6a to 6e that referenced time series data, and a performance state of the business systems 6a to 6e that referenced time series data. FIG. 12 illustrates example configuration management data recorded in the configuration management recorder 51 according to an example embodiment. The configuration management data shown in FIG. 12 is described, for example, in a schema language for XML (Extensible Markup Language), but the description format of the configuration management data is not specifically limited.

In the schema shown in FIG. 12, configuration management data is associated with physical resource information, logical resource information, operating service information, design information, and user information.

Physical resource information is information about actual devices constituting the business systems 6a to 6e. Hardware information, software information, and access information are associated with physical resource information. Hardware information indicating a performance state includes, in addition to information about servers, CPUs, memories, HDDs and the like constituting the individual business systems 6a to 6e, information about position information of the business systems 6a to 6e, devices connected to the business systems 6a to 6e and the like. Information about servers, CPUs, memories, HDDs and the like constituting the individual business systems 6a to 6e is, for example, information about numbers of servers constituting the business systems 6a to 6e, CPU specs, memory capacities, HDD capacities and the like. Software information indicating a performance state is information about software (such as OS and packaged software) installed in the individual business systems 6a to 6e. Access information indicating an access state is information about which business system among a plurality of the business systems 6a to 6e referenced which time series data. The access information includes numbers of times of reference of each business system that referenced time series data.

It can be assumed that the access information according to an example embodiment represents that the sales system 6a, the production system 6b, the purchasing system 6d, and the accounting system 6e referenced the time series data Y1 showing the day-to-day amount of sales of the store A. That is, it can be assumed in an example embodiment that the sales system 6a, the production system 6b, the purchasing system 6d, and the accounting system 6e have performed any processing using the time series data Y1. It is also assumed that the access information according to an example invention represents that the purchasing system 6d referenced the time series data Y2 showing the day-to-day number of items of the commodity B in stock in the store A. That is, it can be assumed in an example embodiment that the purchasing system 6d has performed any processing using the time series data Y2.

Logical resource information is information obtained by virtualizing the above physical resource information. Thus, logical resource information includes, in addition to information obtained by virtualizing physical resource information, mapping information showing correspondence between virtualized information and physical resource information. Operating service information is information about systems in an operation stage of the business systems 6a to 6e. Design information is information about operation policies for operating the business systems 6a to 6e. An example of operation policies is "If the processor time of the sales system 6a shows an abnormal state exceeding 40% for 30 min or longer, add one server to the sales system 6a". User information is information showing permissions granted to each user and the like.

Configuration management data recorded in the configuration management recorder 51 is preset by the administrator of the sensor evaluation system 1 in advance. Thus, for example, when the number of servers constituting a business system is changed, the administrator of the sensor evaluation system 1 updates the hardware information of the configuration management data recorded in the configuration management recorder 51 to the changed number of servers. Also when, for example, the number of servers constituting a business system is changed, the configuration management recorder 51 may update the hardware information of the configuration management data to the changed number of servers based on transmitted change notification after the business system transmits the change notification to the configuration management recorder 51.

The analysis importance calculator 52 calculates importance of the analysis systems 4a and 4b based on configuration management data recorded in the configuration management recorder 51 for each of the analysis systems 4a and 4b. In an example embodiment, the analysis importance calculator 52 calculates importance of the analysis systems 4a and 4b based on the access information of the configuration management data. More specifically, the analysis importance calculator 52 first calculates the number of the business systems 6a to 6e that referenced the time series data Y1 showing the amount of sales based on the access information of the configuration management data. The access information according to an example embodiment represents that the sales system 6a, the production system 6b, the purchasing system 6d, and the accounting system 6e referenced the time series data Y1 and thus, the analysis importance calculator 52 calculates the number of business systems that referenced the time series data Y1 as "4". The analysis importance calculator 52 adopts the calculated number "4" of business systems as the importance of the analysis system 4a unchanged. Moreover, the access information according to an example embodiment represents that the purchasing system 6d referenced the time series data Y2 and thus, the analysis importance calculator 52 calculates the number of business systems that referenced the time series data Y1 as "1". The analysis importance calculator 52 adopts the calculated number "1" of business systems as the importance of the analysis system 4b unchanged.

Next, operations of the sensor evaluation system 5 according to the above configuration will be described with reference to FIG. 13.

Figure 13:
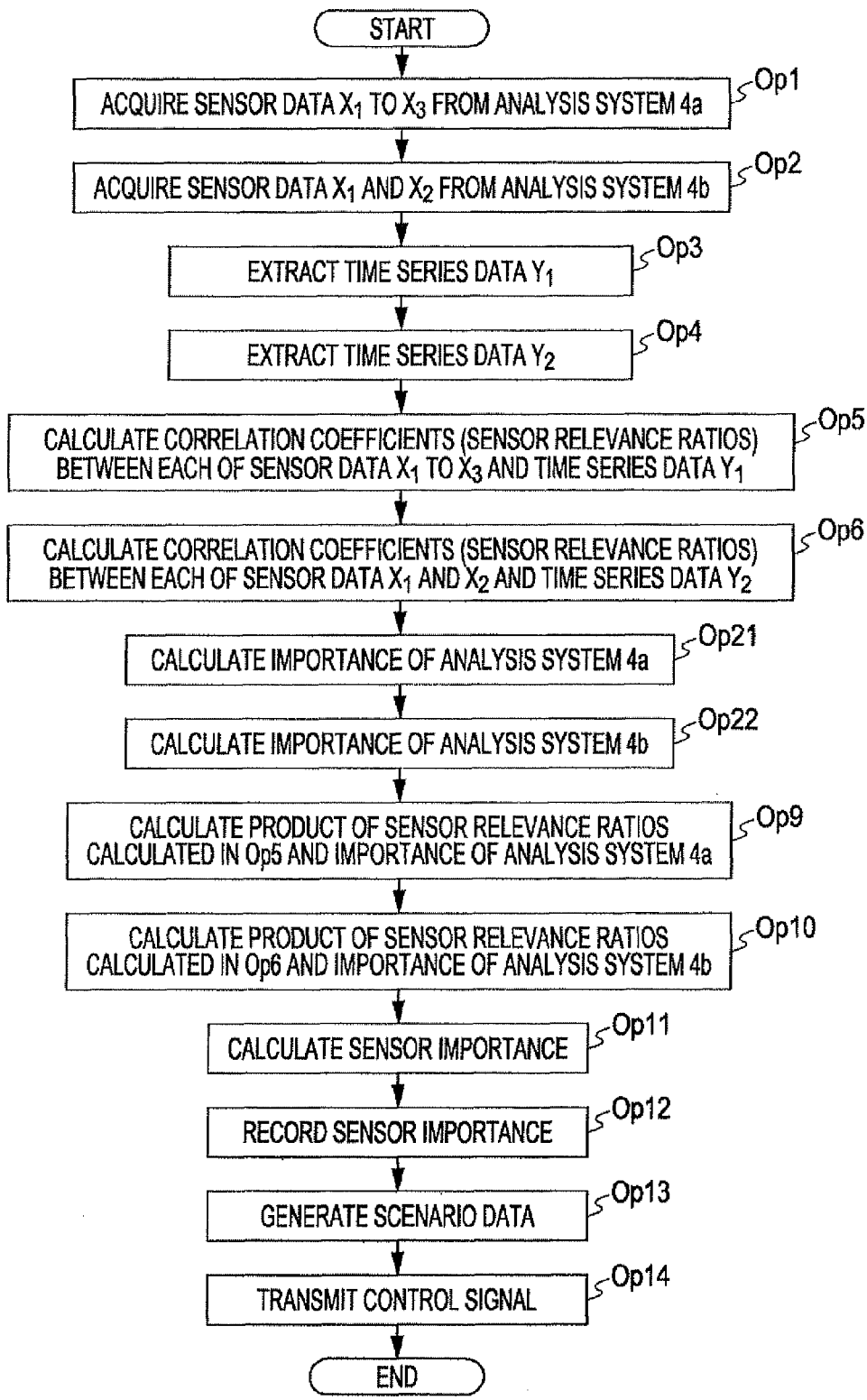
FIG. 13 illustrates example operations of the sensor evaluation system.

FIG. 13 illustrates example operations of the sensor evaluation system 5. Op 1 to Op 6 and Op 9 to Op 14 of operations shown in FIG. 13 are the same as Op 1 to Op 6 and Op 9 to Op 14 shown in FIG. 7.

After Op 6, the analysis importance calculator 52 calculates the number of business systems that referenced the time series data Y1 based on the access information of the configuration management data. In an example embodiment, the analysis importance calculator 52 adopts the calculated number of business systems as the importance of the analysis system 4a unchanged (Op 21). The analysis importance calculator 52 also calculates the number of business systems that referenced the time series data Y2 based on the access information of the configuration management data. In an example embodiment, the analysis importance calculator 52 adopts the calculated number of business systems as the importance of the analysis system 4b unchanged (Op 22).

According to the sensor evaluation system 5 in an example embodiment, as described above, the analysis importance calculator 52 calculates importance of analysis systems associated with time series data based on the number of business systems that referenced the time series data for each of the analysis systems. If, for example, the number of business systems that referenced time series data is large, the analysis importance calculator 52 calculates importance of an analysis system in such a way that the importance of the analysis system associated with the time series data becomes higher. If, on the other hand, the number of business systems that referenced time series data is small, the analysis importance calculator 52 calculates importance of an analysis system in such a way that the importance of the analysis system associated with the time series data becomes lower. This allows the sensor importance calculator 15 to calculate sensor importance based on the sensor relevance ratio calculated for each analysis system while considering analysis system importance calculated for each of the analysis systems and to record the calculated sensor importance in the sensor importance recorder 16.

An example in which the analysis importance calculator 52 calculates the number of business systems that referenced the time series data based on the access information of the configuration management data and adopts the calculated number of business systems as the importance of the analysis system is described above, but an example embodiment is not limited to this. For example, the analysis importance calculator 52 may calculate the number of servers constituting business systems that referenced the time series data based on the hardware information of the configuration management data before calculating importance of the analysis system based on the calculated number of servers. If, as an example, the number of servers constituting the sales system 6a is three, that of servers constituting the production system 6b is 10, and business systems that referenced the time series data are the sales system 6a and the production system 6b, the total number "13" of servers of each system is adopted as the importance of the analysis system. That is, if the number of servers constituting a business system is large, the business system can be considered to be a system of high utilization. Accordingly, in comparison with a configuration in which the number of business systems that referenced time series data is simply adopted as the importance of an analysis system, importance of an analysis system can be calculated while considering importance (the number of servers constituting each business system in the above case) of individual business systems. Incidentally, instead of the number of servers, CPU specs, memory capacities, or HDD capacities constituting a business system may be used. Moreover, importance of an analysis system may be calculated by individually giving scores to the number of servers, CPU specs, memory capacities, HDD capacities and the like constituting a business system. Further, the analysis importance calculator 52 may calculate importance of an analysis system based on the software information of the configuration management data.

Figure 14:
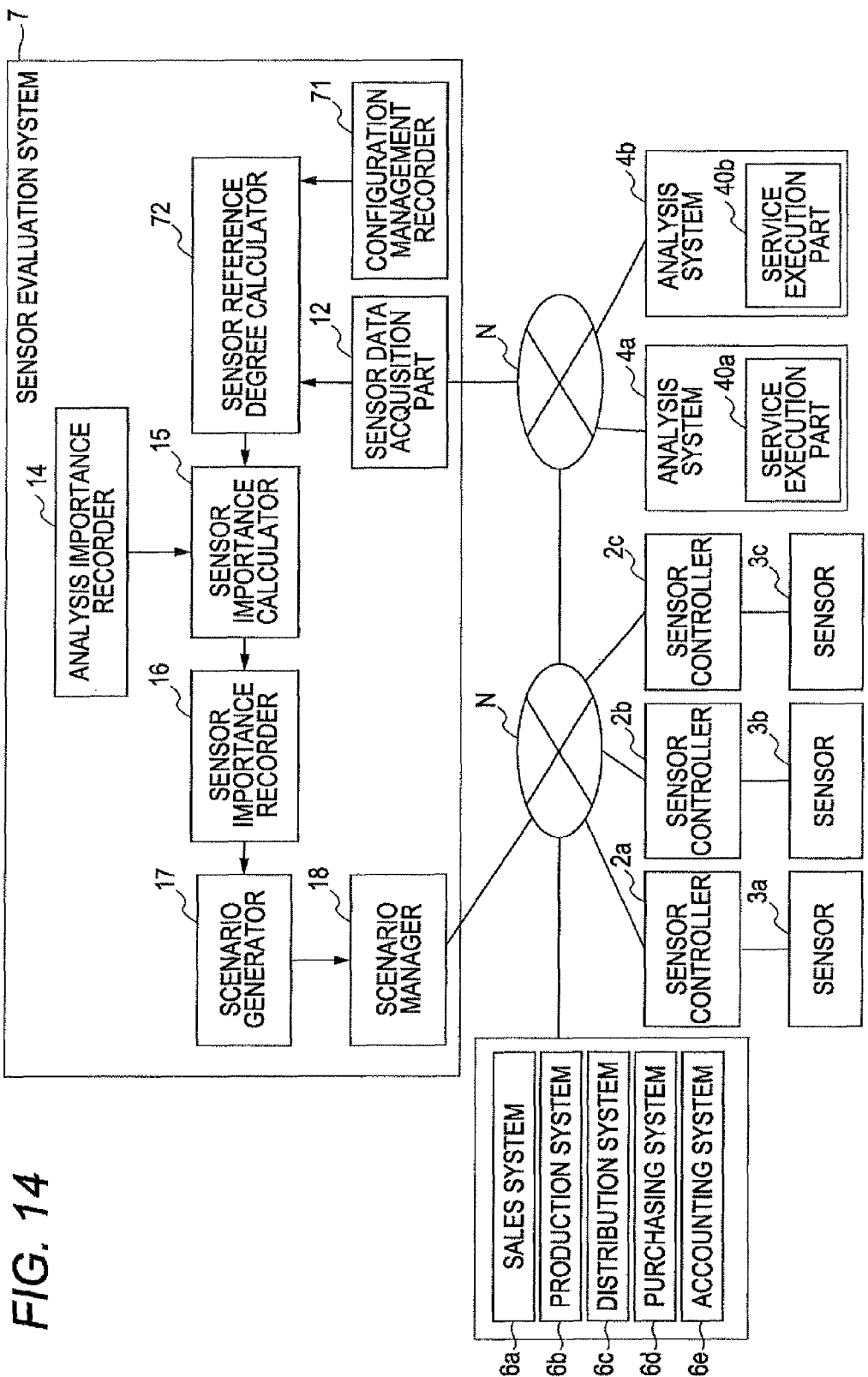
FIG. 14 illustrates the configuration of a sensor evaluation system according to an example embodiment of an example invention including the sensor evaluation system.

FIG. 14 illustrates a sensor evaluation system 7 according to an example embodiment together with the configuration of a whole system including the sensor evaluation system 7. That is, the sensor evaluation system 7 according to an example embodiment has a configuration management recorder 71, in place of the time series data recorder 11 shown in FIG. 1. The sensor evaluation system 7 according to an example embodiment also has a sensor reference degree calculator 72, in place of the sensor relevance ratio calculator 13 shown in FIG. 1. Moreover, the plurality of business systems 6a to 6e is further connected to a network N according to an example embodiment. In FIG. 14, the same reference numerals are attached to components having the same functions as those in FIG. 1 and a detailed description thereof is omitted.

The configuration management recorder 71 records, in addition to configuration management data recorded in the configuration management recorder 51 shown in FIG. 12, configuration management data including at least one of the number of business systems that referenced sensor data obtained from a sensor, an access state of business systems that referenced sensor data obtained from a sensor, and a performance state of business systems that referenced sensor data obtained from a sensor. Like the configuration management data shown in FIG. 12, the configuration management data recorded in the configuration management recorder 71 is associated with physical resource information, logical resource information, operating service information, design information, and user information. Like the physical resource information shown in FIG. 12, the physical resource information is associated with hardware information, software information, and access information.

It can be assumed that the access information according to an example embodiment represents that the sales system 6a referenced sensor data X1 obtained from the sensor 3a. That is, It can be assumed in an example embodiment that the sales system 6a has performed any processing using the time series sensor data X1 indicating the number of printed tickets. It is also assumed that the access information according to an example embodiment represents that the sales system 6a and the purchasing system 6d referenced sensor data X2 obtained from the sensor 3b. That is, It can be assumed in an example embodiment that the sales system 6a and the purchasing system 6d have performed any processing using the sensor data X2 indicating the number of delivered items of the commodity B in the store A. Further, It can be assumed that the access information according to an example embodiment represents that the sales system 6a, the production system 6b, the purchasing system 6d, and the accounting system 6e referenced sensor data X3 obtained from the sensor 3c. That is, it can be assumed in an example embodiment that the sales system 6a, the production system 6b, the purchasing system 6d, and the accounting system 6e have performed any processing using the sensor data X3 indicating the number of customers in the store A.

The sensor reference degree calculator 72 calculates sensor reference degrees indicating the degrees of the sensor data X1 to X3 used by the service execution part 40a of the analysis system 4a to provide analysis service being referenced based on configuration management data recorded in the configuration management recorder 71. In an example embodiment, the sensor reference degree calculator 72 calculates a sensor reference degree based on access information of the configuration management data. More specifically, the sensor reference degree calculator 72 first calculates the number of the business systems 6a to 6e that referenced the sensor data X1 obtained from the sensor 3a based on the access information of the configuration management data. The access information according to an example embodiment represents that the sales system 6a referenced the sensor data X1 obtained from the sensor 3a and thus, the sensor reference degree calculator 72 calculates the number of business systems that referenced the sensor data X1 obtained from the sensor 3a as "1". The sensor reference degree calculator 72 adopts the calculated number "1" of business systems as the sensor reference degree of the sensor 3a unchanged. Moreover, the access information according to an example embodiment represents that the sales system 6a and the purchasing system 6d referenced the sensor data X2 obtained from the sensor 3b and thus, the sensor reference degree calculator 72 calculates the number of business systems that referenced the sensor data X2 obtained from the sensor 3b as "2". The sensor reference degree calculator 72 adopts the calculated number "2" of business systems as the sensor reference degree of the sensor 3b unchanged. Furthers the access information according to an example embodiment represents that the sales system 6a, the production system 6b, the purchasing system 6d, and the accounting system 6e referenced the sensor data X3 obtained from the sensor 3c and thus, the sensor reference degree calculator 72 adopts the number "4" of business systems that referenced the sensor data X3 obtained from the sensor 3c as the sensor reference degree of the sensor 3c unchanged.

The sensor reference degree calculator 72 calculates sensor reference degrees indicating the degrees of the sensor data X1 and X2 used by the service execution part 40b of the analysis system 4b to provide analysis service being referenced based on configuration management data recorded in the configuration management recorder 71. FIG. 15 is a diagram for illustrating sensor reference degrees calculated by the sensor reference degree calculator 72 according to an example embodiment. In an example embodiment, It can be assumed, as shown in FIG. 15, that the sensor reference degree calculator 72 has calculated the sensor reference degree of "1" for the sensor 3a, that of "2" for the sensor 3b, and that of "4" for the sensor 3c in the analysis system 4a. It is also assumed that the sensor reference degree calculator 72 has calculated the sensor reference degree of "1" for the sensor 3a and that of "2" for the sensor 3b in the analysis system 4b.

Next, operations of the sensor evaluation system 7 according to the above configuration will be described with reference to FIG. 16.

Figure 16:
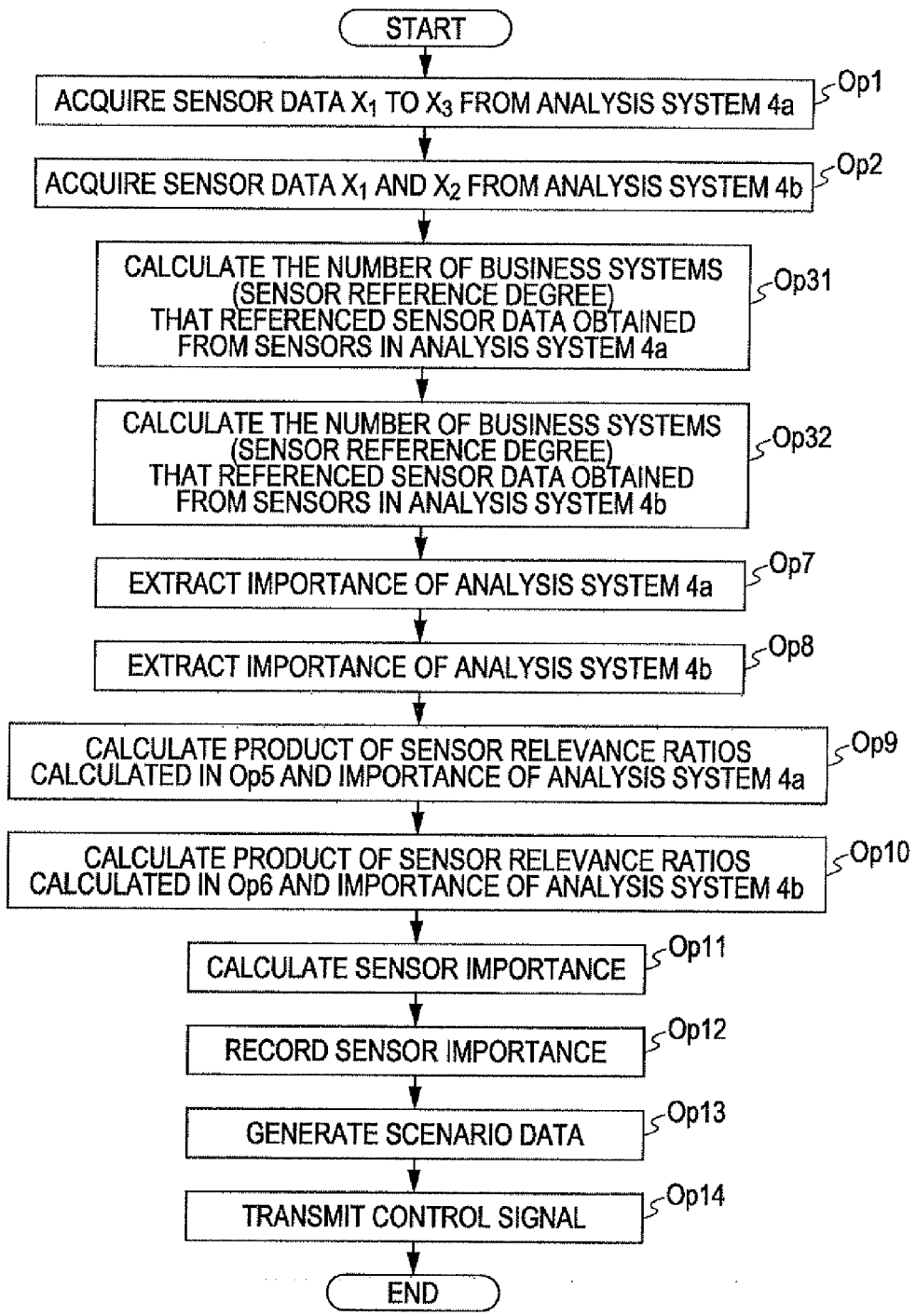
FIG. 16 illustrates example operations of the sensor evaluation system.

FIG. 16 illustrates example operations of the sensor evaluation system 7. Op 1 and Op 2 and Op 7 to Op 14 of operations shown in FIG. 16 are the same as Op 1 and Op 2 and Op 7 to Op 14 shown in FIG. 7.

After Op 2, the sensor reference degree calculator 72 calculates sensor reference degrees in the analysis system 4a based on the access information of the configuration management data. In an example embodiment, the sensor reference degree calculator 72 adopts the number of business systems that referenced sensor data obtained from a sensor as the sensor reference degree unchanged (Op 31). The sensor reference degree calculator 72 also calculates sensor reference degrees in the analysis system 4b based on the access information of the configuration management data. In an example embodiment, the sensor reference degree calculator 72 adopts the number of business systems that referenced sensor data obtained from a sensor as the sensor reference degree unchanged (Op 32).

According to the sensor evaluation system 7 in an example embodiment, as described above, the sensor reference degree calculator 72 calculates a sensor reference degree indicating the degree of sensor data used by the service execution parts 40a or 40b to provide analysis service being referenced based on the number of business systems that referenced sensor data obtained from a sensor. If, for example, the number of business systems that referenced sensor data obtained from a sensor is large, the sensor reference degree calculator 72 calculates a sensor reference degree in such a way that the reference degree of the sensor becomes higher. If, on the other hand, the number of business systems that referenced sensor data obtained from a sensor is small, the sensor reference degree calculator 72 calculates a sensor reference degree in such a way that the reference degree of the sensor becomes lower. Thus, by calculating sensor reference degrees, the sensor reference degrees are obtained as data quantitatively showing to which extent sensor data used by the service execution parts 40a and 40b to provide analysis service is referenced by the business systems 6a to 6e. That is, the sensor reference degrees are obtained as data to be a guide to judging how important sensor data used by the service execution parts 40a or 40b to provide analysis service is to the analysis service. Thus, the sensor importance calculator 15 can calculate sensor importance using the calculated sensor reference degrees as a guide before recording the calculated sensor importance in the sensor importance recorder 16. Accordingly, the sensor importance can be calculated without requiring much time even if a sensor or an analysis system is dynamically added to/deleted from a network.

An example in which the sensor reference degree calculator 72 calculates the number of business systems that referenced a sensor based on the access information of the configuration management data and adopts the calculated number of business systems as the sensor reference degree is described above, but an example embodiment is not limited to this. For example, the sensor reference degree calculator 72 may calculate the number of servers constituting business systems that referenced a sensor based on the hardware information of the configuration management data before calculating a sensor reference degree based on the calculated number of servers. If, as an example, the number of servers constituting the sales system 6a is three, that of servers constituting the production system 6b is 10, and business systems that referenced a sensor are the sales system 6a and the production system 6b, the total number "13" of servers of each system is adopted as the sensor reference degree. That is, if the number of servers constituting a business system is large, the business system can be considered to be a system of high utilization. Accordingly, in comparison with a configuration in which the number of business systems that referenced a sensor is simply adopted as the sensor reference degree, the sensor reference degree can be calculated while considering importance (the number of servers constituting each business system in the above case) of individual business systems. Incidentally, instead of the number of servers, CPU specs, memory capacities, or HDD capacities constituting a business system may be used. Moreover, the sensor reference degree may be calculated by individually giving scores to the number of servers, CPU specs, memory capacities, HDD capacities and the like constituting a business system. Further, the sensor reference degree calculator 72 may calculate the sensor reference degree based on the software information of the configuration management data.

Figure 17:
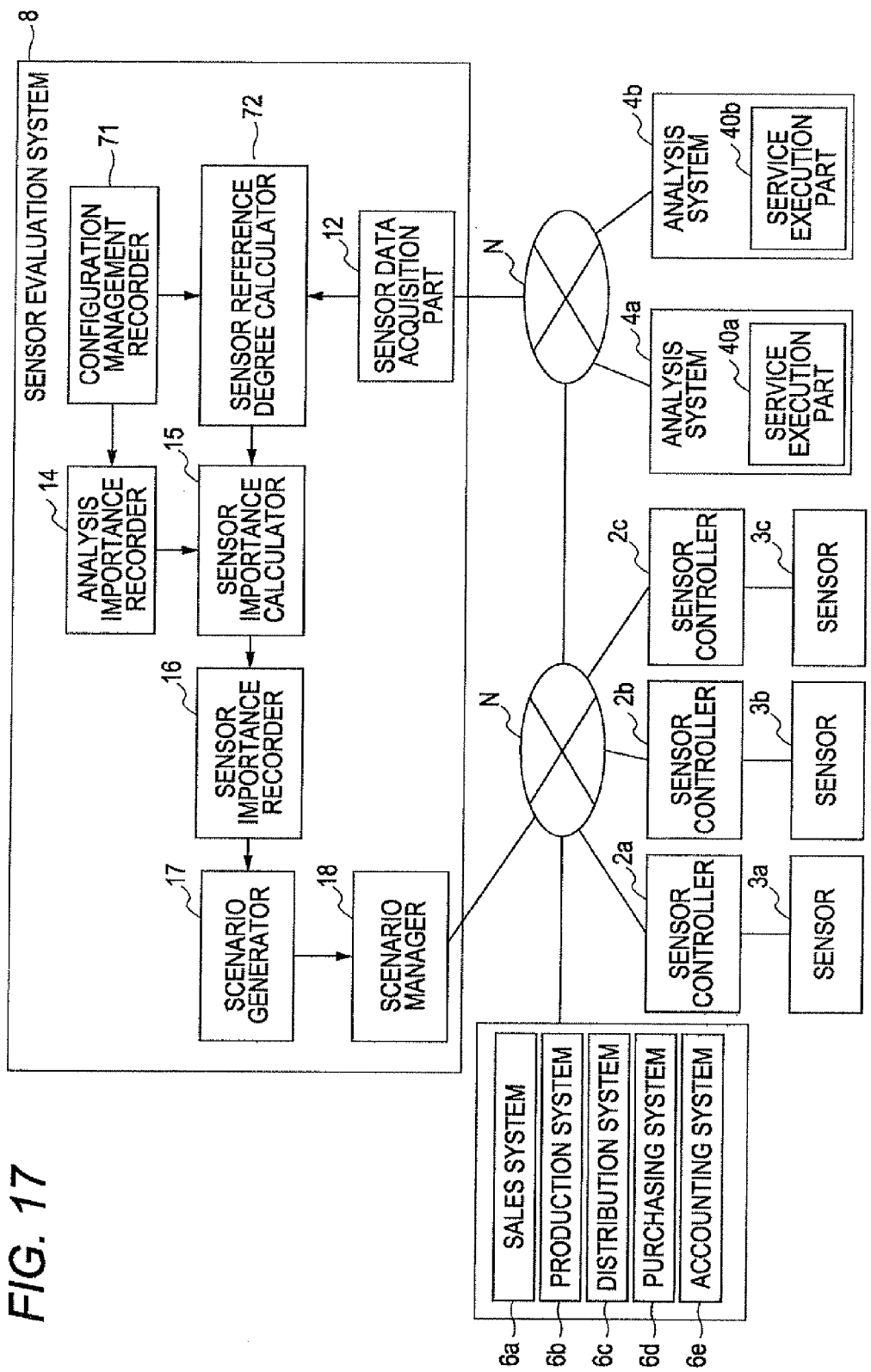
FIG. 17 illustrates a sensor evaluation system according to an example embodiment an example including the sensor evaluation system.

FIG. 17 illustrates a sensor evaluation system 8 according to an example embodiment together with the configuration of a whole system including the sensor evaluation system 8. That is, the sensor evaluation system 8 according to an example embodiment has an analysis importance calculator 81, in place of the analysis importance recorder 14 shown in FIG. 14. In FIG. 17, the same reference numerals are attached to components having the same functions as those in FIG. 14 and a detailed description thereof is omitted.

The analysis importance calculator 81 calculates importance of the analysis systems 4a and 4b based on configuration management data recorded in the configuration management recorder 51 for each of the analysis systems 4a and 4b. In an example embodiment, the analysis importance calculator 81 calculates importance of the analysis systems 4a and 4b based on access information of the configuration management data. More specifically, the analysis importance calculator 81 first calculates the number of business systems 6a to 6e that referenced the time series data Y1 based on the access information of the configuration management data. In an example embodiment, the analysis importance calculator 81 adopts the calculated number of business systems as the importance of the analysis system 4a unchanged. The analysis importance calculator 81 also calculates the number of business systems 6a to 6e that referenced the time series data Y2 based on the access information of the configuration management data. In an example embodiment, the analysis importance calculator 81 adopts the calculated number of business systems as the importance of the analysis system 4b unchanged.

Next, operations of the sensor evaluation system 8 according to the above configuration will be described with reference to FIG. 18.

Figure 18:
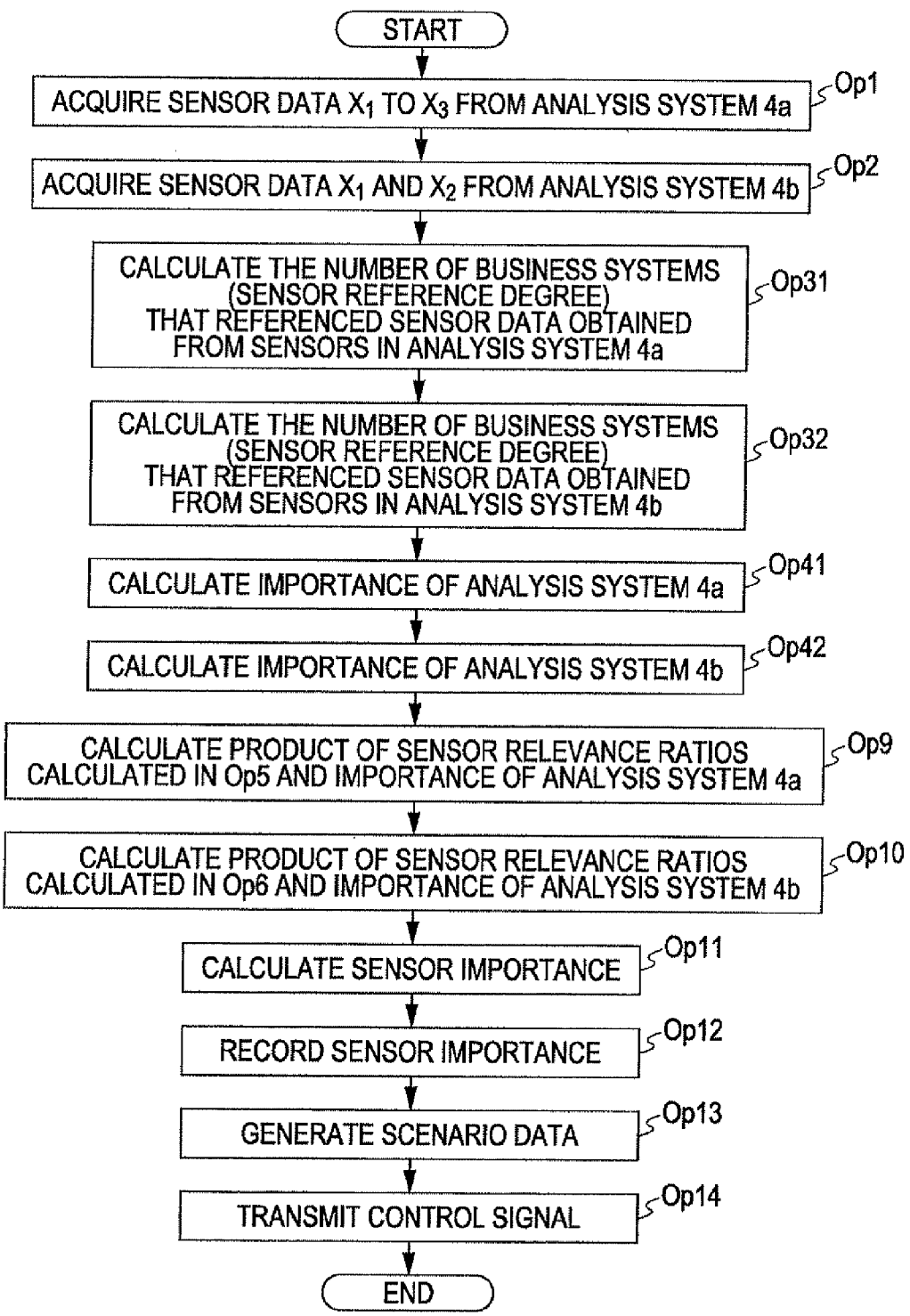
FIG. 18 illustrates example operations of the sensor evaluation system.

FIG. 18 illustrates example operations of the sensor evaluation system 8. Op 1 and Op 2, Op 31 and Op 32, and Op 9 to Op 14 of operations shown in FIG. 18 are the same as Op 1 and Op 2, Op 31 and Op 32, and Op 9 to Op 14 shown in FIG. 16.

After Op 32, the analysis importance calculator 81 calculates the number of business systems that referenced the time series data Y1 based on the access information of the configuration management data. In an example embodiment, the analysis importance calculator 81 adopts the calculated number of business systems as the importance of the analysis system 4a unchanged (Op 41). The analysis importance calculator 81 also calculates the number of business systems that referenced the time series data Y2 based on the access information of the configuration management data. In an example embodiment, the analysis importance calculator 81 adopts the calculated number of business systems as the importance of the analysis system 4b unchanged (Op 42).

According to the sensor evaluation system 8 in an example embodiment, the analysis importance calculator 81 calculates importance of analysis systems associated with time series data based on the number of business systems that referenced the time series data for each of the analysis systems. If, for example, the number of business systems that referenced time series data is large, the analysis importance calculator 81 calculates importance of an analysis system in such a way that the importance of the analysis system associated with the time series data becomes higher. If, on the other hand, the number of business systems that referenced time series data is small, the analysis importance calculator 81 calculates importance of an analysis system in such a way that the importance of the analysis system associated with the time series data becomes lower. This allows the sensor importance calculator 15 to calculate sensor importance based on the sensor reference degree calculated for each analysis system while considering analysis system importance calculated for each of the analysis systems and to record the calculated sensor importance in the sensor importance recorder 16.

Embodiments of an example invention have been described above, but the scope of application of an example invention is not limited to the above embodiments. Other examples of data provided by a sensor for detecting physical or chemical events include data (such as data representing eye movement, a floor reaction force system, and electromyogram) obtained by somatometry, motion capturing data, acceleration data, CPU load, and GPS data. Other examples of data provided by a sensor for detecting events indicated by information generated by information processing include data representing patterns of Web access, data indicating an effect of advertising on Web sites, data indicating trends of input operations by users, amounts of communication packets, and the number of transactions.

As described above, a sensor evaluation system, a sensor evaluation method, and a sensor evaluation program are able to calculate sensor importance without requiring much time even if a sensor or an analysis system is dynamically added to/deleted from a network.

As described above, a sensor evaluation system, a sensor evaluation method, and a sensor evaluation program are capable of calculating sensor importance without requiring much time even if a sensor or an analysis system is dynamically added to/deleted from a network.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, failing within the scope thereof.

What is claimed is:

1. A sensor evaluation system coupled to a network including a plurality of sensors and an analysis system having a service execution part for providing analysis service using time series sensor data obtained from at least one of the plurality of sensors, comprising:

a time series data recorder in which time series data showing changes with time of events having predetermined relations with the analysis service is recorded by associating with the analysis system;

a sensor relevance ratio calculator calculating sensor relevance ratios indicating relevance ratios of sensor data to the time series data by comparing changes with time of events indicated by the time series data and time series records of the sensor data used by the service execution part to provide analysis service in an identical period; and a sensor importance calculator calculating sensor importance using the sensor relevance ratios calculated by the sensor relevance ratio calculator wherein the sensor relevance ratio calculator performing regression analysis using changes with time of events indicated by the time series data and time series records of the sensor data used by the service execution part to provide analysis service and calculates sensor relevance ratios based on results of performing the regression analysis.

2. The sensor evaluation system according to claim 1, further comprising:

an analysis importance recorder in which identification data for identifying each of a plurality of the analysis systems and analysis system importance associated with each piece of the identification data are recorded, and wherein the sensor importance calculator calculating the sensor importance based on the sensor relevance ratio calculated by the sensor relevance ratio calculator for each of the analysis systems and the analysis system importance recorded in the analysis importance recorder for each of the analysis systems before recording the calculated sensor importance in the sensor importance recorder.

3. The sensor evaluation system according to claim 1, wherein the network further includes a plurality of business systems for executing predetermined functions, the sensor evaluation system, further comprising an analysis importance calculator calculating importance of each of a plurality of the analysis systems associated with the time series data based on at least one of a number of business systems that referenced the time series data, an access state of business systems that referenced the time series data, and a performance state of business systems that referenced the time series data for each of the analysis systems, wherein the sensor importance calculator calculating the sensor importance based on the sensor relevance ratio calculated by the sensor relevance ratio calculator for each of the analysis systems and the analysis system importance calculated by the analysis importance calculator for each of the analysis systems before recording the calculated sensor importance in the sensor importance recorder.

4. The sensor evaluation system according to any of claims 2, 3 or 1, wherein the sensor relevance ratio calculator calculating correlation coefficients indicating correlations between changes with time of events indicated by the time series data and time series records of the sensor data used by the service execution part to provide analysis service and calculates sensor relevance ratios based on the calculated correlation coefficients.

5. The sensor evaluation system according to any of claims 2, 3 or 1, further comprising:

a scenario generator generating scenario data indicating an operation of the sensor after determining the operation of the sensor based on the sensor importance recorded in the sensor importance recorder; and a scenario manager generating control instructions for causing the sensor to perform the sensor operation indicated by the scenario data generated by the scenario generator before transmitting control signals indicated by the generated control instructions to the sensor.

6. The sensor evaluation system according to any of claims 2, 3 or 1, further comprising:

a maintenance manager generating a maintenance schedule for maintaining the sensor or inventory data showing a number of items of the sensor in stock based on the sensor importance recorded in the sensor importance recorder.

7. A sensor evaluation system coupled to a network including a plurality of sensors, an analysis system having a service execution part providing analysis service using sensor data obtained from at least one of the plurality of sensors, and a plurality of business systems for executing predetermined functions, comprising:

a sensor reference degree calculator calculating sensor reference degrees indicating the degrees of sensor data used by the service execution part to provide analysis service being referenced based on at least one of a number of business systems that referenced sensor data obtained from the sensors, an access state of business systems that referenced sensor data obtained from the sensors, and a performance state of business systems that referenced sensor data obtained from the sensors;

a sensor importance calculator calculating sensor importance using the sensor reference degrees calculated by the sensor reference degree calculator; and a sensor relevance ratio calculator performing regression analysis using changes with time of events indicated by time series data and time series records of the sensor data used by the service execution part to provide analysis service and calculates sensor relevance ratios based on results of performing the regression analysis.

8. The sensor evaluation system according to claim 7, further comprising an analysis importance recorder in which identification data for identifying each of a plurality of the analysis systems and analysis system importance associated with each piece of the identification data are recorded, wherein the sensor importance calculator calculating the sensor importance based on the sensor reference degree calculated by the sensor reference degree calculator for each of the analysis systems and the analysis system importance recorded in the analysis importance recorder for each of the analysis systems before recording the calculated sensor importance in the sensor importance recorder.

9. The sensor evaluation system according to claim 7, further comprising an analysis importance calculator for calculating importance of each of a plurality of the analysis systems associated with the time series data based on at least one of a number of business systems that referenced the time series data, an access state of business systems that referenced the time series data, and a performance state of business systems that referenced the time series data for each of the analysis systems, wherein the sensor importance calculator calculating the sensor importance based on the sensor reference degree calculated by the sensor reference degree calculator for each of the analysis systems and the analysis system importance calculated by the analysis importance calculator for each of the analysis systems before recording the calculated sensor importance in the sensor importance recorder.

10. A sensor evaluation method performed by a computer coupled to a network including a plurality of sensors and an analysis system having a service execution part for providing analysis service using time series sensor data obtained from at least one of the plurality of sensors and provided with a time series data recorder in which time series data showing changes with time of events having predetermined relations with the analysis service is recorded by associating with the analysis system, comprising:

a sensor relevance ratio calculation at which a sensor relevance ratio calculator provided with the computer calculates sensor relevance ratios indicating relevance ratios of sensor data to the time series data by comparing changes with time of events indicated by the time series data and time series records of the sensor data used by the service execution part to provide analysis service in an identical period;

a sensor importance calculation at which a sensor importance calculator provided with the computer calculates sensor importance using the sensor relevance ratios calculated at the sensor relevance ratio calculation; and a sensor relevance ratio calculator performing regression analysis using changes with the time of events indicated by time series data and time series records of the sensor data used by the service execution part to provide analysis service and calculates sensor relevance ratios based on results of performing the regression analysis.

11. A sensor evaluation method performed by a computer coupled to a network including a plurality of sensors, an analysis system having a service execution part for providing analysis service using sensor data obtained from at least one of the plurality of sensors, and a plurality of business systems for executing predetermined functions, comprising:

a sensor reference degree calculation at which a sensor reference degree calculator provided with the computer calculates sensor reference degrees indicating the degrees of sensor data used by the service execution part to provide analysis service being referenced based on at least one of a number of business systems that referenced sensor data obtained from the sensors, an access state of business systems that referenced sensor data obtained from the sensors, and a performance state of business systems that referenced sensor data obtained from the sensors;

a sensor importance calculation at which a sensor importance calculator provided with the computer calculates sensor importance using the sensor reference degrees calculated at the sensor reference degree calculation; and a sensor relevance ratio calculator performing regression analysis using changes with time of events indicated b time series data and time series records of the sensor data used by the service execution part to provide analysis service and calculates sensor relevance ratios based on results of performing the regression analysis.

12. A non-transitory computer-readable medium storing a sensor evaluation program for causing a computer coupled to a network including a plurality of sensors and an analysis system having a service execution part for providing analysis service using time series sensor data obtained from at least one of the plurality of sensors and provided with a time series data recorder in which time series data showing changes with time of events having predetermined relations with the analysis service is recorded by associating with the analysis system to perform processing includes:

sensor relevance ratio calculation processing for calculating sensor relevance ratios indicating relevance ratios of sensor data to the time series data by comparing changes with time of events indicated by the time series data and time series records of the sensor data used by the service execution part to provide analysis service in an identical period;

sensor importance calculation processing for calculating sensor importance using the sensor relevance ratios calculated by the sensor relevance ratio calculation processing; and a sensor relevance ratio calculation performing regression analysis using changes with time of events indicated by the time series data and time series records of the sensor data used by the service execution part to provide analysis service and calculates sensor relevance ratios based on results of performing the regression analysis.

13. A non-transitory computer readable medium storing a sensor evaluation program for causing a computer coupled to a network including a plurality of sensors, an analysis system having a service execution part for providing analysis service using sensor data obtained from at least one of the plurality of sensors, and a plurality of business systems for executing predetermined functions to perform processing includes:

sensor reference degree calculation processing for calculating sensor reference degrees indicating the degrees of sensor data used by the service execution part to provide analysis service being referenced based on at least one of a number of business systems that referenced sensor data obtained from the sensors, an access state of business systems that referenced sensor data obtained from the sensors, and a performance state of business systems that referenced sensor data obtained from the sensors;

sensor importance calculation processing for calculating sensor importance using the sensor reference degrees calculated by the sensor reference degree calculation processing; and a sensor relevance ratio calculation performing regression analysis using changes with time of events indicated by time series data and time series records of the sensor data used by the service execution part to provide analysis service and calculates sensor relevance ratios based on results of performing the regression analysis.

* * * * *

UNITED STATES PATENT AND TRADEMARK OFFICE
CERTIFICATE OF CORRECTION

| | |
|---|---|
| PATENT NO. | : 8,103,482 B2 |
| APPLICATION NO. | : 12/187785 |
| DATED | : January 24, 2012 |
| INVENTOR(S) | : Yasuhide Matsumoto et al. |

It is certified that error appears in the above-identified patent and that said Letters Patent is hereby corrected as shown below:

Column 24, Line 54, Claim 11, delete "indicated b" and insert -- indicated by --, therefor.

Signed and Sealed this
Twenty-ninth Day of May, 2012

David J. Kappos
*Director of the United States Patent and Trademark Office*